(12) United States Patent
Haas et al.

(10) Patent No.: US 12,042,880 B2
(45) Date of Patent: Jul. 23, 2024

(54) DEVICE AND METHOD FOR LASER CUTTING A WORKPIECE AND PRODUCING WORKPIECE PARTS

(71) Applicant: BYSTRONIC LASER AG, Niederoenz (CH)

(72) Inventors: Titus Haas, Zofingen (CH); Simon Scheidiger, Langenthal (CH); Markus Steinlin, Zürich (CH); Michael Berger, Bern (CH)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 18/263,785

(22) PCT Filed: Mar. 9, 2022

(86) PCT No.: PCT/EP2022/056022
§ 371 (c)(1),
(2) Date: Aug. 1, 2023

(87) PCT Pub. No.: WO2022/189499
PCT Pub. Date: Sep. 15, 2022

(65) Prior Publication Data
US 2024/0033858 A1    Feb. 1, 2024

(30) Foreign Application Priority Data
Mar. 9, 2021   (EP) .................................. 21161527

(51) Int. Cl.
*B23K 26/38*       (2014.01)
*B23K 26/06*       (2014.01)
(Continued)

(52) U.S. Cl.
CPC .......... *B23K 26/38* (2013.01); *B23K 26/0643* (2013.01); *B23K 26/0648* (2013.01);
(Continued)

(58) Field of Classification Search
CPC .. B23K 31/12; B23K 26/082; B23K 26/0876; B23K 26/0648; B23K 26/0643; B23K 26/38
(Continued)

(56) References Cited

U.S. PATENT DOCUMENTS

| 4,532,402 A | 7/1985 | Overbeck |
| 5,109,148 A | 4/1992 | Fujita et al. |

(Continued)

FOREIGN PATENT DOCUMENTS

| DE | 2821883 B1 | 10/1979 |
| DE | 102008053397 B4 | 12/2012 |

(Continued)

OTHER PUBLICATIONS

International Search Report and Written Opinion, mailed Jun. 13, 2022, from PCT/EP2022/056022.

(Continued)

*Primary Examiner* — Dana Ross
*Assistant Examiner* — Joseph W Iskra
(74) *Attorney, Agent, or Firm* — Workman Nydegger

(57) ABSTRACT

Cutting a workpiece and producing workpiece parts are disclosed. The device has a cutting head with laser beam optics with a dynamic laser beam movement unit. A cutting head movement unit moves the laser beam over the workpiece. A control unit has a determination module to determine a movement trajectory of the laser beam, a memory unit from which at least one predetermined parameter selected from a movement parameter of the cutting head movement unit, a movement parameter of the laser beam movement unit and a parameter of a deviation of a cut contour from a predetermined contour is retrievable, and an optimization module for adjusting the movement trajectory by overlaying the movement of the laser beam via the (Continued)

cutting head with a high frequency beam-shaping movement of the laser beam via the laser beam movement unit based on the at least one predetermined parameter.

22 Claims, 10 Drawing Sheets

(51) Int. Cl.
  *B23K 26/08*  (2014.01)
  *B23K 26/082*  (2014.01)
  *B23K 31/12*  (2006.01)
(52) U.S. Cl.
  CPC ........ *B23K 26/0876* (2013.01); *B23K 26/082* (2015.10); *B23K 31/12* (2013.01)
(58) Field of Classification Search
  USPC .................................................. 219/121.72
  See application file for complete search history.

(56) References Cited

U.S. PATENT DOCUMENTS

| | | | |
|---|---|---|---|
| 8,781,269 | B2 | 7/2014 | Huber et al. |
| 9,250,390 | B2 | 2/2016 | Muendel et al. |
| 9,346,126 | B2 | 5/2016 | Watanabe et al. |
| 2020/0246920 | A1 | 8/2020 | Nakagawa et al. |
| 2020/0398373 | A1* | 12/2020 | Rataj ................. B23K 26/0648 |

FOREIGN PATENT DOCUMENTS

| | | |
|---|---|---|
| DE | 102015116033 A1 | 3/2016 |
| DE | 102015101263 A1 | 7/2016 |
| DE | 102018220336 A1 | 1/2020 |
| DE | 102019120830 A1 | 2/2021 |
| EP | 0815499 B1 | 5/1999 |
| EP | 1758003 B1 | 11/2011 |
| EP | 1838486 B1 | 9/2012 |
| EP | 2730363 A1 | 5/2014 |
| EP | 2303502 B1 | 6/2014 |
| EP | 2762263 A1 | 8/2014 |
| EP | 2778746 B1 | 1/2016 |
| EP | 3747588 A1 | 12/2020 |
| WO | WO2020245353 | * 12/2020 |

OTHER PUBLICATIONS

Haas, T., "Set Point Opitimization for Machine Tools", ETHZ, 2018.
Lanz, et al., "Efficient Static and Dynamic Modelling of Machine Structures with Large Linear Motions", International Journal of Automation Technology, vol. 12, pp. 622-630, Aug. 17, 2018.
Brugmann, M., et al., "A theoretical model for reactive gas laser cutting of metals", Lasers in Manufacturing Conference, 2019.
Brugmann, M., et al., "Optimization of Reactive Gas Laser Cutting Parameters based on a combination of Semi-Analytical modelling and Adaptive Neuro-Fuzzy Inference System (ANFIS)", Lasers in Manufacturing Conference, 2019.
Wetzig et al., "Fast Beam Oscillations Improve Laser Cutting of Thick Materials, State of the Art and Outlook", PhotonicsViews, Jun. 2020, vol. 17, Issue 3.
Goppold et al., "Dynamic Beam Shaping Improves Laser Cutting of Thick Steel Plates", Industrial Photonics, May 2017.
Mahrle et al., "Theoretical aspects of fibre laser cutting", Journal of Physics D Applied Physics, Aug. 2009.
Press Release, "Dynamic beam shaping increases the attractiveness of laser beam fusion cutting", 2016, https://www.iws.fraunhofer.de/en/pressandmedia/press_releases/2016/press_release_2016-15.html.
Goppold, C. et al., "Tip-Tilt piezo platform scanner qualifies dynamic beam shaping for high laser power in cutting applications", Laser in Manufacturing Conference, Munich Jun. 2019.
International Preliminary Report on Patentability, mailed Apr. 14, 2023, from PCT/EP2022/056022.
Zirn, Oliver, "Modelling and Simulation of Highly Dynamic Manufacturing Systems: A Practical Introduction", Abstract, Jan. 2006.
Schuocker et al., "Theoretical Model of Groove Formation During Laser Cutting", In: Waidelich, W. Laser/ Optoelectronics in Engineering, Springer, Berlin, Heidelberg, 1986.

* cited by examiner

DEVICE AND METHOD FOR LASER CUTTING A WORKPIECE AND PRODUCING WORKPIECE PARTS

FIELD OF THE INVENTION

The invention relates to a device for laser cutting a workpiece and producing workpiece parts, a method for laser cutting a workpiece and producing workpiece parts, as well as a computer program product and a computer-readable medium.

BACKGROUND

Laser machining devices are used for the laser machining of workpieces, in particular in methods for the thermal separation of materials by means of laser beams, such as laser cutting. In many cases, a laser machining head is used to direct the machining laser beam onto the workpiece, for example onto a sheet metal to be machined. The laser machining head is typically guided over the workpiece on trajectories, particularly in the X and Y directions, by means of mechanical axes operated via actuators. Furthermore, in machining devices, the optical axis of the machining laser beam can be moved relative to the central axis of the exit aperture of the laser machining head by means of actuators.

There are various approaches to have actuators interact in machining devices, such as those described in EP1758003 B1, U.S. Pat. No. 4,532,402 A, EP0815499 B1, EP1838486 B1, "Set Point Opitimization for Machine Tools", ETHZ, T. Haas, 2018, and US5109148 A. These approaches relate to machining devices in which, compared to laser cutting devices, lower masses are moved by the actuators and/or lower powers are used for machining the workpiece. Furthermore, there are machine models to characterise the kinematic properties of machine tools, as described for example in "Modellbildung and Simulation hochdynamischer Fertigungssysteme, eine praxisnahe Einführung", O. Zirn and S. Weikert, 2006 and further N. Lanz, D. Spescha, S. Weikert and K. Wegener, "Efficient Static and Dynamic Modelling of Machine Structures with Large Linear Motions," International Journal of Automation Technology, Vol. 12, pp. 622-630, 2018. Furthermore, models for estimating surface defects, and/or laser process-related workpiece quality characteristics are known, see for example Schuöcker D., Walter B., "Theoretisches Modell der Riefenbildung beim Laserschneiden", in: Waidelich W. Laser/Optoelektronik in der Technik/Laser/Optoelectronics in Engineering, Springer, Berlin, Heidelberg, 1986; M. Brügmann, M. Muralt, B. Neuenschwander, S. Wittwer and T. Feurer, "A theoretical model for reactive gas laser cutting of metals," Lasers in Manufacturing Conference, 2019; and M. Brügmann, M. Muralt, B. Neuenschwander, S. Wittwer and T. Feurer, "Optimization of Reactive Gas Laser Cutting Parameters based on a combination of Semi-Analytical modelling and Adaptive Neuro-Fuzzy Inference System (ANFIS)", Lasers in Manufacturing Conference, 2019.

When laser machining workpieces, it may be desirable to use different laser beams depending on the machining process and/or depending on the workpiece, for example depending on the thickness and material of a sheet of metal to be cut. Some commercially available laser machining heads provide an unchangeable optical imaging ratio for the laser beam from the laser source. However, in practice, this type of imaging must be regarded as a compromise, especially in laser cutting: fixed imaging is associated with losses in cutting quality, specifically in the quality of the produced workpiece parts, namely surface roughness and burr adhesion, as well as with lower feed rates, especially for medium to large metal sheet thicknesses. In recent years, zoom optics for laser machining heads have been developed to adapt the spot size of the focused laser beam to the respective application. In laser cutting using cutting heads, for example, the spot size of the focused laser beam is adapted to the metal sheet thickness and the material of the sheet. Approaches that go a step further in adapting the laser beam tool to the machining process are those in which the intensity distribution and/or the beam quality of the laser beam, for example the beam parameter product (BPP), can also be adapted to the laser application. Various solutions in this direction are known, for example from U.S. Pat. No. 8,781,269 B2, U.S. Pat. No. 9,250,390 B2, U.S. Pat. No. 9,346,126 B2, EP 2730363 A1, EP2762263 A1, DE2821883 B1, DE 102015116033 A1, EP 2778746 B1, DE 102015101263 A1, DE102008053397 B4.

High frequency beam oscillation is one of the technologies of dynamic beam shaping (DBS). In this process, the laser beam, or in the case of a focused laser beam its focal point, is moved at frequencies of, for example, 100 Hz to 10 kHz, in particular perpendicular to the direction of propagation of the laser beam. In this manner, almost any intensity distribution of the laser beam can be produced with a DBS system integrated in a laser machining head. This makes it possible, for example, to achieve advantageous flexibility in adapting to the respective metal sheet thickness and/or sheet quality when laser cutting metal sheets. The dynamic properties of a DBS system, such as speed and acceleration, are significant, for example a factor of 1000 or more higher than those of the mechanical axes of the laser machining device. Due to the small diameter of the exit aperture of the laser machining head and the limited beam deflection of the DBS system, the working range of the DBS system is small, for example a few hundred micrometres to a few millimetres. Better cutting results can be achieved using a laser tool adapted to the DBS system, see e.g., Wetzig et al.: Fast Beam Oscillations Improve Laser Cutting of Thick Materials, State of the Art and Outlook, PhotonicsViews, 3/2020; Goppold et al.: Chancen and Herausforderungen der dynamischen Strahlformung, Deutscher Schneidkongress, 2018; Goppold, et al.: Dynamic Beam Shaping Improves Laser Cutting of Thick Steel Plates, Industrial Photonics, 2017; Goppold, et al.: Laserschmelzschneiden mit dynamischer Strahlformung, Fraunhofer IWS Jahresbericht, 2015; Mahrle et al.: theoretical aspects of fibre laser cutting, Journal of Physics D Applied Physics, 2009; https://www.iws.fraunhofer.de/en/pressandmedia/press_releases/2016/press_release_2016-15.html. Fraunhofer IWS Dresden has shown that a tip-tilt piezo platform scanner system seems to be particularly suitable for dynamic beam shaping (C. Goppold et al., "Tip-Tilt piezo platform scanner qualifies dynamic beam shaping for high laser power in cutting applications", LIM Konferenz, Munich June 2019). Here, an approx. 1 inch large mirror was coupled to a piezo drive as an actuator, which moves the mirror in a highly dynamic manner.

The working range of the mechanical axes of a laser cutting device in X and Y directions is large, the dynamics of the mechanical axes are small, for example 1 m/s, respectively 10 m/s^2. Due to the dynamic limits of the mechanical axes, the speed of the cutting head movement is typically reduced when laser cutting in corners and small radii of the workpiece parts to be produced. Dynamic limits of the mechanical axes are often deliberately chosen to be smaller than physically possible in order to reduce errors in the contours, what are termed contour errors, of the workpiece parts to be cut. However, this requires significantly more time for the laser cutting process and significantly reduces the productivity of the laser cutting device. In order to prevent having to reduce the movement speed of the cutting head so much, a rounding of the geometry to be cut or of the trajectory of the cutting head can be applied, especially at corners and small radii of the workpiece parts. However, the rounding can result in undesirable contour errors as a deviation from the target contour of the workpiece.

US 2020/398373 A1, which forms the closest prior art, discloses an optical device for shaping an electromagnetic wave beam, having an optical element positioned within beam propagation direction, and an exciter means functionally connected to the optical element for inducing an oscillation of the focal point in at least one of an x direction and any direction of a plane perpendicular to the beam propagation direction along a focal point oscillation path. EP 3747588 A1 discloses a processing device for laser processing of a workpiece in a processing zone, with at least one stationary laser beam guidance device with at least one movable surface, the at least one movable surface being adjustable in such a way that it modifies the focal length of the optical system and/or the beam parameter product of the time-integrated processing laser beam in at least one operating mode. DE 102018220336 A1 describes a device for beam shaping. A second optical deflection element is designed to shift a point of impact of the laser beam on a workpiece surface, and a first optical deflection element is designed to position a focal plane of the laser beam relative to the workpiece surface by a translational movement and/or to change an intensity distribution within a beam cross section of the laser beam. DE 102019120830 A1 discloses a guide device for guiding a laser beam, comprising a deflection unit for guiding a laser focus of the laser beam along a trajectory, said deflection unit comprising at least one movable optical element arranged in the beam path of the laser beam and serving for deflecting the laser beam, and comprising a control unit for controlling the at least one movable optical element, said control unit comprising a trajectory planning program for planning the trajectory of the laser focus. Thereby, roundings of the laser focus trajectory are produced at corners or angles thereof, thereby reducing deviations of the actual trajectory from the target trajectory. EP 2303502 B1 relates to a device for cutting workpieces with a laser beam. In a device, a laser beam is deflected two-dimensionally by means of at least one reflective, pivotable element and is directed onto the surface of the workpiece together with a cutting gas using focusing optics through a cutting nozzle. A two-axis relative movement between the workpiece and the laser beam is carried out with elements accommodated in a cutting head. US 2020/246920 A1 discloses a laser cutting device including a control unit that controls operations of laser machining robot and laser oscillator.

It is the object of the invention to provide a device and a method for laser cutting and for producing workpiece parts which enable high productivity and high quality, in particular contour accuracy, of the cut workpiece parts.

This object is achieved by a device for laser cutting a workpiece and producing workpiece parts according to claim 1, a method for laser cutting a workpiece and producing workpiece parts according to claim 12, as well as a computer program product according to claim 21 and a computer-readable medium according to claim 22.

One embodiment of the invention relates to a device for laser cutting a workpiece, preferably a workpiece made of or containing at least one metal, and producing workpiece parts, comprising a cutting head. The cutting head has an interface for a laser source for generating a machining laser beam with a power of at least 200 W, preferably at least 1 kW, more preferably 1 kW to 40 kW, an exit aperture for the machining laser beam, and laser beam optics between the interface and the exit aperture. The laser beam optics have at least one dynamic laser beam movement unit for producing a high frequency beam-shaping movement of the machining laser beam at least perpendicular to its direction of propagation. The device for laser cutting is provided with a cutting head movement unit for performing a movement of the machining laser beam over the workpiece via the cutting head; and a control unit for controlling the cutting head movement unit and the laser beam movement unit. The control unit has:

a determination module for determining at least one movement trajectory of the machining laser beam in at least one workpiece plane according to at least one predetermined contour of the workpiece parts to be produced;

a memory unit from which at least one predetermined parameter selected from a movement parameter of the cutting head movement unit, a movement parameter of the laser beam movement unit and a parameter of a deviation of a cut contour from the predetermined contour can be retrieved; and an optimisation module for adjusting the movement trajectory by overlaying the movement of the machining laser beam via the cutting head with the high frequency beam-shaping movement of the machining laser beam via the laser beam movement unit based on the at least one predetermined parameter retrievable from the memory unit.

The optimisation module is configured for optimising the movement trajectory by redundantly partitioning the movement trajectory of the machining laser beam between the cutting head movement unit and the laser beam movement unit. Thus, the optimisation module can be configured for optimising the movement trajectory of the machining laser beam in at least one workpiece plane by redundantly partitioning the movement trajectory of the machining laser beam between the cutting head movement unit and the laser beam movement unit. This is due to the fact that by the device of embodiments, the movement trajectory of the machining laser beam in at least one workpiece plane can be reorganized by reallocating components of the movement trajectory of the laser beam to the slow mechanical axes of the cutting head movement unit and/or by reallocating components of the movement trajectory of the laser beam to the at least one fast dynamic laser beam movement unit, based on the at least one predetermined parameter selected from the movement parameter of the cutting head movement unit, the movement parameter of the laser beam movement unit and the parameter of a deviation of a cut contour from the predetermined contour. Thereby, the movement trajectory of the machining laser beam can be sophisticatedly, flexibly and/or continuously or discontinuously changed and/or varied along its length at least at regions thereof, in which deviations of the actual cut contour from the target contour occur, and thus optimised. Hence, the movement trajectory of the machining laser beam is decisively improved as compared to a simple superposition of the movement of the machining laser beam over the workpiece via the cutting head and of the high frequency beam-shaping movement of the machining laser beam at least perpendicular to its direction of propagation.

The optimisation module can be configured for adjusting, e.g. increasing or reducing, and/or for optimising at least one parameter selected from the movement parameter of the cutting head movement unit, the movement parameter of the laser beam movement unit and the parameter of a deviation of a cut contour from the predetermined contour and/or for thus predetermining the respective parameter. Thereby, at least one of the respective other at least one parameters can be optimised and/or thus predetermined. For instance, at least one rounding tolerance of the cutting head movement unit and/or at least one dynamic limit of the cutting head movement unit can be adapted, e.g. increased. Thereby, a movement parameter of the dynamic laser beam movement unit can be adapted and/or optimised, in order to optimise the eventual movement trajectory of the machining laser beam. Thus, the movement trajectory of the machining laser beam can be purposefully optimised e.g. at angles or radii of the predetermined contour to avoid undesired roundings at the respective angles or radii of the cut contour. Hence, according to embodiments of the device and of the method performed with the device, it is not only deviations of the actual trajectory from the target trajectory of the laser beam which are reduced, rather, deviations of the actual cut contour from the target contour, i.e. from the predetermined contour, are reduced, allowing to produce e.g. sharp angles or radii.

The device of the above embodiments enables the movement trajectory of the machining laser beam to be optimised using the optimisation module on the basis of the at least one predetermined parameter and to be performed during laser cutting. The movements of the machining laser beam triggered by the cutting head movement unit and the laser beam movement unit are synchronous and therefore overlay one another. The optimised movement trajectory can be realised by redundantly partitioning the movement trajectory of the machining laser beam between the cutting head movement unit and the laser beam movement unit. This means, for example, that the performance of the movement trajectory is partitioned and/or reallocated between mechanical axes of the cutting head movement unit and a DBS system of the laser beam movement unit, each of which uses actuators to move the machining laser beam in the X and Y directions. Taking into account the at least one predetermined parameter, undesired deviations of the movement trajectory from an ideal movement trajectory corresponding to the predetermined contour of the workpiece parts to be produced, such as a cutting plan, can be compensated for and/or avoided in this manner. For example, path deviations of the cutting head movement unit induced by the dynamics of the cutting head movement unit and/or contour errors and/or surface defects of the workpiece parts to be produced, such as scoring, surface roughness or adhering burr, can be reduced or avoided. Furthermore, the cutting process can be shortened in time, as the optimised movement trajectory means that the speed of the cutting head need not be reduced in corners and small radii of the workpiece parts to be produced. Deviations between TCP (Tool Centre Point, Laser Spot) and target contour resulting from axis errors and/or vibrations of the cutting head movement unit can be compensated for and resulting contour errors on the workpiece be reduced. This applies in particular to dynamically induced contour errors (at the TCP), which result due to the masses and the compliance of the moving components of the device for laser cutting. In addition, the kerf width can be optimised. The optimised movement trajectory can also be used to improve the expulsion of melt produced during cutting from the kerf when using a cutting gas.

Thus, by combining advantageous properties of the cutting head movement unit, in particular its large working range, and the laser beam movement unit, in particular its high dynamics, the optimisation module can increase the productivity of the device for laser cutting, as well as improve the accuracy of the laser cutting, the cutting quality and the quality of the produced workpiece parts. For example, a high-performance laser cutting head with integrated DBS system and the mechanical axes of a laser cutting device can be combined via its CNC (Computerised Numerical Control) or PLC (Programmable Logic Controller) control/controller in such a way that a redundant movement distribution as described above results for the laser beam tool. Taking advantage of this redundancy, which is made possible by the combination of the mechanical axes and the DBS system, the method for laser cutting can be improved.

Thus, by embodiments of the device and of the method performed with the device, at least one of the following effects can be achieved: Deviations of the actual cut contour from the target contour, the deviations being estimated or measured, can be compensated. By purposely increasing the rounding tolerance of the cutting head movement at angles or radii of the predetermined contour, a higher movement speed can be achieved at the angles or the radii, and a resulting deviation from the predetermined contour can be compensated using the dynamic laser beam movement unit. By purposely increasing the dynamic limits of the cutting head movement unit, e.g. the acceleration, a reduced machining time per part to be produced can be achieved, and a resulting deviation from the predetermined contour can be compensated using the dynamic laser beam movement unit. The movement trajectory of the machining laser beam can be reorganized, in particular optimized, by a partitioning, in particular by a modified and/or optimized partitioning, of the movement trajectory between the cutting head movement unit and the dynamic laser beam movement unit.

In embodiments, an adjustment of the movement trajectory of the machining laser beam with the optimisation module can be performed while determining the movement trajectory with the determination module. Alternatively, the determination module can be used to determine a complete movement trajectory of the machining laser beam according to the at least one predetermined contour or segments of a predetermined contour of the workpiece parts, which is adjusted using the optimisation module on the basis of the at least one predetermined parameter. These variants can also be combined with one another.

According to embodiments, the at least one predetermined parameter can include quality optimisation parameters, i.e., parameters related to the quality of the workpiece parts to be produced, in particular the parameter of a deviation of a cut contour from the predetermined contour, and/or trajectory optimisation parameters, i.e., parameters related to the movement trajectory of the machining laser beam, in particular the movement parameter of the cutting head movement unit and/or the movement parameter of the laser beam movement unit. According to further embodiments, the movement parameter of the cutting head movement unit can include and/or result at least in part from the mass of the cutting head and/or the mass of one or more inertial components of the cutting head movement unit, for example the mechanical axes. Furthermore, the movement parameter of the dynamic laser beam movement unit can include the mass of a dynamically movable optical element and/or result at least in part from its mass. The total mass of the cutting head and the inertial components of the cutting head movement unit can be in the range of 200 to 500 kg, the mass of the cutting head can be in the range of 15 to 20 kg, and/or the mass of the dynamically movable optical element can be in the range of 7 and 30 g.

With the dynamic laser beam movement unit, a high frequency beam-shaping movement of the machining laser beam can be performed at least perpendicular to its direction of propagation. In particular, a high frequency oscillation of the machining laser beam can be performed. In the case of a focused machining laser beam, the focal point of the machining laser beam can be moved and/or oscillated at high frequency in this manner, at least perpendicular to its direction of propagation. With embodiments of the device, the machining laser beam can be moved at least partially at a frequency between 10 Hz to 15 kHz, preferably between 100 Hz and 10 kHz. For example, the dynamic laser beam movement unit can include a dynamically movable deflection device that deflects the machining laser beam and/or a dynamically movable optical unit that optically images the machining laser beam.

The dynamic laser beam movement unit can include at least one dynamically movable optical element. Furthermore, the dynamic laser beam movement unit can comprise at least one actuator. The at least one optical element can be at least partially dynamically movable and/or adjustable with the at least one actuator. According to embodiments, the optical element can comprise at least one element selected from a lens, a focusing lens, a collimating lens, an optical fibre, in particular a fibre end, a coupling for an optical fibre, an end cap of an optical fibre, a mirror, a deflecting mirror, a segment mirror, a mirror having at least one deformable surface, and a combination thereof. According to embodiments, the actuator can include at least one element selected from a piezo actuator, an electric motor, a pneumatic motor, a quartz crystal oscillator, an eccentric, a device for generating an oscillating electromagnetic field, a MEMs (Micro Electro Mechanical System) oscillator, a voice coil, an electrostatically movable actuator, a plurality thereof and/or a combination thereof. For example, the mirror having at least one deformable surface can be at least one element selected from a mirror deformable with at least one piezo actuator, a deformable bimorphic mirror, a mirror deformable based on MEMS or MOEMS and a mirror deformable based on a voice coil. According to a further embodiment, at least one mirror can be provided which is rotatable about an axis which forms an angle with a reflecting plane of the mirror, and which is orientable such that the angle is greater than or less than 90°. This allows the tilt angle of the mirror to be set and the tilted mirror to be able to rotate rapidly about its axis, for example at a frequency of 100 Hz to 10 kHz. If the angle is set not equal to 90°, the laser beam describes a circular movement.

According to embodiments, a laser source for generating a machining laser beam with a power of at least 200 W, preferably at least 1 kW, more preferably 1 kW to 40 kW, can be provided at the interface.

According to embodiments, the movement parameter of the cutting head movement unit can be at least one of a dynamic limit of the cutting head movement unit, a rounding tolerance of the cutting head movement unit at an angle of the predetermined contour, and a rounding tolerance of the cutting head movement unit at a radius of the predetermined contour. The movement parameter of the laser beam movement unit can be at least one parameter selected from a dynamic limit of the laser beam movement unit and a maximum movement amplitude of the machining laser beam that can be generated with the laser beam movement unit.

The parameter of a deviation of a cut contour from the predetermined contour can be at least one of an estimated deviation, a parameter resulting from a measured deviation, a rounding of the cut contour at an angle of the predetermined contour, a rounding of the cut contour at a radius of the predetermined contour, an estimated surface defect of a cut edge, and a parameter resulting from a measured surface defect of a cut edge. Based on one or more of the aforementioned parameters, the movement trajectory of the machining laser beam can be adjusted by the optimisation module and thus be optimised. This can be realised by suitably partitioning the movement trajectory of the machining laser beam between the cutting head movement unit and the laser beam movement unit. In this way, an optimised movement of the cutting head movement unit, in particular of its mechanical axes, can be achieved. Furthermore, contour errors of the workpiece parts to be produced can be reduced or avoided.

In embodiments, the optimisation module can be designed to adjust the movement trajectory based on at least one increased rounding tolerance of the cutting head movement unit. The optimisation module can further be designed to compensate for the deviation of the cut contour from the predetermined contour resulting from the at least one increased rounding tolerance, in particular a larger deviation. This allows the machining laser beam to move via the cutting head movement unit at increased speeds in corners and small radii of the workpiece parts to be produced. This means that considerably less time is required for the laser cutting process per workpiece part and the productivity of the device for laser cutting is significantly increased.

According to one embodiment, the memory unit can store a machine model representing the kinematic behaviour of the moving cutting head and estimating state data of the cutting head movement as a movement parameter of the cutting head movement unit, and as a further parameter a resulting deviation of the cut contour from the predetermined contour, and wherein the optimisation module is in data communication with the memory unit for reading the machine model. For example, contour errors can be estimated in a model-based manner at the TCP and on this basis the movement trajectory can be adjusted by the optimisation module.

In a modification of embodiments, in particular a modification of the preceding embodiment, the optimisation module can be designed to adjust the movement trajectory based on at least one increased dynamic limit of the cutting head movement unit. The optimisation module can further be designed to compensate for the deviation of the cut contour from the predetermined contour resulting from the at least one increased dynamic limit. In particular, the contour errors can be increased due to the at least one increased dynamic limit. The thus magnified contour errors can be reduced or eliminated by embodiments of the device and/or method. Furthermore, the productivity of the device for laser cutting can be increased in this manner.

According to embodiments, the memory unit can store a process model representing the laser cutting process and estimating as parameters state data of the laser cutting process and a resulting deviation of the cut contour from the predetermined contour, and wherein the optimisation module is in data communication with the memory unit for reading the process model. In particular, a deviation between corresponding actual state data and corresponding target state data can be estimated. In this manner, optimal process parameters, such as laser power, cutting speed, gas pressure of the cutting gas and distance from the exit aperture to the workpiece, can be calculated and taken into account by the optimisation module to adjust the movement trajectory. By using the process model, the cutting quality in particular can be improved. In particular, a combination of an embodiment with a process model and an embodiment with a machine model leads to beneficial effects. Coupling the process model with the machine model enables the optimised process parameters obtained from the optimisation module to be available locally, for example at millisecond intervals. In this manner, different optimised process parameters can be calculated for one and the same workpiece part.

In other embodiments, the control unit can have a database of predetermined 2- and/or 3-dimensional Lissajous figures and the laser beam movement unit can be designed to induce high frequency oscillation of the focal point of the machining laser beam on a focal point oscillation path in the form of a Lissajous figure or a combination of more than one Lissajous figure based on the database. Thus, in combination with the optimised movement trajectory, the cutting quality can be additionally improved, especially the cutting quality for workpieces of higher thickness, in particular thicknesses of 3 mm and more.

Furthermore, a detector device connected to the memory unit in a data-transmitting manner can be provided on or in the cutting head, in particular at a further interface, for measuring a surface defect of a cut edge, in particular scoring, as the parameter of a deviation of the cut contour from the predetermined contour. In this way, surface defects of at least one cut edge of the produced workpiece parts, such as scoring and adhering burrs, can be measured and a resulting parameter can be taken into account by the optimisation module when optimising the movement trajectory. In particular, a deviation between the corresponding actual state, i.e., the measurement results, and the corresponding target state, i.e., the predetermined contour, can be determined. On this basis, surface defects that occur during cutting, such as scoring created during thermal cutting, can be compensated for.

In embodiments, a model for estimating a surface defect of a cut edge, in particular scoring, can be stored in the memory unit, which estimates as parameters a surface defect and a resulting deviation of the cut contour from the predetermined contour, and wherein the optimisation module is in data communication with the memory unit in order to read the model for estimating a surface defect. In particular, a deviation between corresponding actual state data and corresponding target state data can be estimated. Thus, based on an estimate of surface defects of a cut edge, such as scoring and adhering burr, a resulting parameter can be determined and taken into account by the optimisation module when optimising the movement trajectory. This is another way to compensate for surface defects that occur during cutting, such as scoring created during thermal cutting.

In embodiments, the optimisation module can take into account a distance of the optical axis of the machining laser beam from the central axis of the exit aperture of the laser machining head as a predetermined parameter when adjusting the movement trajectory. The distance can be set temporarily or permanently and/or be constant or variable. The adjustment of the distance of the optical axis relative to the central axis of the exit aperture can, for example, be assigned to and realised by the dynamic laser beam movement unit. In this way, the movement trajectory of the machining laser beam in corners and small radii can be used advantageously to optimise quality.

In further embodiments, the optimisation module can take into account a surface texture to be produced on the workpiece parts by the laser beam movement unit as a predetermined parameter when adjusting the movement trajectory. This can be advantageous in a downstream machining process, such as producing an adhesive bond, due to the larger surface area resulting from the surface structure.

In further embodiments, the optimisation module can take into account an adjusted, in particular optimised, kerf width as a predetermined parameter when adjusting the movement trajectory. For example, the kerf width can be adjusted to the thickness of a workpiece, a dimension of the gas jet, a dimension of the exit aperture of the cutting head and/or a distance of the workpiece parts to be produced from one another or from workpiece offcuts or workpiece remnants. The adjustment of the kerf width can, for example, be assigned to and realised by the dynamic laser beam movement unit. This allows the melt expulsion by the cutting gas to be optimised, for example by adjusting the diameter of the machining laser beam, in particular the diameter of the focal point, to the diameter of the cutting gas jet and/or to the dimension of the exit aperture of the cutting head.

In embodiments, the optimisation module can consider a predetermined kerf width as a predetermined parameter when adjusting the movement trajectory. For example, the kerf width can be kept constant at least in sections during laser cutting. Setting and/or maintaining the predetermined, i.e., defined, kerf width can, for example, be assigned to and realised by the dynamic laser beam movement unit. The defined kerf width can simplify the unloading of the produced workpiece parts, for example when using automated unloading systems. Furthermore, a compromise between a desired kerf width and the laser machining time can be achieved.

In further embodiments, the optimisation module can consider a varying kerf width as a predetermined parameter when adjusting the movement trajectory. In this manner, it can be achieved that the varying kerf width, for example undesired fluctuations of the kerf width, are compensated for. Furthermore, the tool correction can be compensated for in this way. In addition, the size and/or thickness of the zone of melt produced on the workpiece during cutting can be kept substantially constant. Compensation for the varying kerf width can, for example, be assigned to and realised by the dynamic laser beam movement unit. For example, for this purpose, the laser beam movement unit can be designed to induce a high frequency oscillation of the focal point of the machining laser beam on a focal point oscillation path in the form of a Lissajous figure or a combination of more than one Lissajous figure and to vary the size of the Lissajous figure or the combination of more than one Lissajous figure.

A further embodiment relates to a use of a device according to one of the above embodiments and modifications for laser cutting a workpiece, in particular a workpiece made of or containing at least one metal.

One embodiment of the invention relates to a method for laser cutting a workpiece, preferably a workpiece of or comprising at least one metal, and producing workpiece parts with a device for laser cutting a workpiece and producing workpiece parts according to one of the above embodiments and modifications, wherein a laser source for generating a machining laser beam with a power of at least 200 W, preferably at least 1 kW, is provided at the interface, wherein the method comprises the steps of:

by means of the determination module of the control unit, determining at least one movement trajectory of the machining laser beam in at least one workpiece plane according to at least one predetermined contour of the workpiece parts to be produced;

by means of the optimisation module of the control unit, adjusting the movement trajectory by overlaying the movement of the machining laser beam via the cutting head with the high frequency beam-shaping movement of the machining laser beam via the dynamic laser beam movement unit on the basis of the at least one predetermined parameter retrievable from the memory unit;

producing the machining laser beam with a power of at least 200 W, preferably at least 1 kW, and cutting the workpiece with the machining laser beam; and moving the machining laser beam over the workpiece via the cutting head and performing a high frequency beam-shaping movement of the machining laser beam at least perpendicular to its direction of propagation via the laser beam movement unit according to the adjusted movement trajectory.

The adjusting includes optimising the movement trajectory by redundantly partitioning the movement trajectory of the machining laser beam between the cutting head movement unit and the laser beam movement unit. At least one parameter selected from the movement parameter of the cutting head movement unit, the movement parameter of the laser beam movement unit and the parameter of a deviation of a cut contour from the predetermined contour can be adjusted, e.g. increased or reduced, and/or optimised and/or thus predetermined. Thereby, at least one of the respective other parameters can be optimised and/or thus predetermined. For instance, the adjusting and/or optimising can include increasing at least one rounding tolerance of the cutting head movement unit and/or at least one dynamic limit of the cutting head movement unit. Thereby, a movement parameter of the dynamic laser beam movement unit can be adapted and/or optimised, in order to optimise the eventual movement trajectory of the machining laser beam.

In embodiments of the method, the adjustment can be performed based on at least one increased rounding tolerance of the cutting head movement unit. The adjustment can further include compensating for the deviation of the cut contour from the predetermined contour resulting from the at least one increased rounding tolerance.

According to one embodiment of the method, the memory unit can store a machine model representing the kinematic behaviour of the moving cutting head and estimating state data of the cutting head movement as a movement parameter of the cutting head movement unit and as a further parameter a resulting deviation of the cut contour from the predetermined contour, and wherein the adjustment includes reading the machine model from the memory unit into the optimisation module.

In embodiments, in particular in the above embodiment, the adjustment can be performed based on at least one increased dynamic limit of the cutting head movement unit. The adjustment can further include compensating for the deviation of the cut contour from the predetermined contour resulting from the at least one increased dynamic limit.

In further embodiments of the method, the memory unit can store a process model representing the laser cutting process and estimating as parameters state data of the laser cutting process and a resulting deviation of the cut contour from the predetermined contour, and wherein the adjustment comprises reading the process model from the memory unit into the optimisation module. In particular, a deviation between corresponding actual state data and corresponding target state data can be estimated.

In the method, the control unit can have a database of predetermined 2- and/or 3-dimensional Lissajous figures, and the laser beam movement unit can induce a high frequency oscillation of the focal point of the machining laser beam on a focal point oscillation path in the form of a Lissajous figure or a combination of more than one Lissajous figure based on the database.

In embodiments of the method, a detector device connected to the memory unit in a data-transmitting manner can be provided on or in the cutting head, and the detector device can measure a surface defect of a cut edge, in particular scoring, as the parameter of a deviation of the cut contour from the predetermined contour. In particular, a deviation between the corresponding actual state and the corresponding target state can be determined. Alternatively or in addition, a model for estimating a surface defect of a cut edge, in particular scoring, can be stored in the memory unit, which estimates as parameters a surface defect and a resulting deviation of the cut contour from the predetermined contour, and the adjustment can include reading the model for estimating a surface defect from the memory unit into the optimisation module. In particular, a deviation between corresponding actual state data and corresponding target state data can be estimated.

According to one embodiment, the method can be performed after a previous laser cutting of the workpiece, which was performed with the at least one movement trajectory determined by the determination module, in particular without using the optimisation module. As a result, surface defects on the workpiece, in particular on the cut edge, such as adhering melt and/or melt droplets and burrs, can be reduced and/or removed by re-machining the produced workpiece parts with the machining laser beam optimised by the optimisation module and targeted melting and blowing out with a cutting gas or vaporisation.

One embodiment of the invention relates to a computer program product comprising one or more program modules which cause the device to perform method steps according to any of the embodiments and variations, in particular when the program modules are loaded into a memory of the device, in particular comprising at least one element selected from the determination module and the optimisation module. The machine model, the process model and/or the model for estimating a surface defect of the cut edge, each according to embodiments, can also be designed as program modules and/or included in the computer program product.

Another embodiment relates to a computer-readable medium on which the computer program product according to the above embodiment is stored.

With the above embodiments of the method for laser cutting a workpiece and producing workpiece parts, the same advantages and functions can be realised as with the embodiments of the device for laser cutting a workpiece and producing workpiece parts, in particular with identical and/or analogous features.

Further features and efficiencies arise from the following description of exemplary embodiments, the figures and the dependent claims. The above-mentioned features and those described below can be used without departing from the scope of the present invention not only in the respective combinations indicated, but also in other combinations or in isolation.

BRIEF DESCRIPTION OF THE DRAWINGS

The invention is explained in more detail below on the basis of exemplary embodiments with reference to the accompanying drawings, which likewise disclose features that are essential to the invention. These exemplary embodiments are used for illustration purposes only and are not to be construed as limiting. For example, a description of an exemplary embodiment with a large number of elements or components should not be interpreted to the effect that all of these elements or components are necessary for implementation. Rather, other exemplary embodiments can also contain alternative elements and components, fewer elements or components, or additional elements or components. Elements or components of different exemplary embodiments can be combined with one another, unless otherwise stated.

Modifications and variations which are described for one of the exemplary embodiments can also be applied to other exemplary embodiments. To avoid repetition, elements that are the same or that correspond to one another are denoted by the same reference symbols in different figures and are not explained more than once. In the figures.

DETAILED DESCRIPTION OF SOME EXAMPLE EMBODIMENTS

The movement trajectory, also referred to as the trajectory, is understood to mean the temporal processing of the movement trajectory curves or movement trajectory points for the machining laser beam obtained by the determination module and/or the optimisation module. The movement trajectory can comprise at least one segment of the movement path for the machining laser. The terms "dynamic laser beam movement unit" and "laser beam movement unit" are used synonymously here. Further, the term "movement of the machining laser beam via the cutting head" and variations thereof mean movement of the machining laser beam by moving the cutting head with the cutting head movement unit. The term "cut edge" is understood to mean one or more cut edges of a produced, i.e., cut, workpiece part. The terms "device for laser cutting a workpiece and for producing workpiece parts" and "device for laser cutting" are used synonymously here. The terms "machining laser beam" and "laser beam" are also used synonymously. The term "movement trajectory" includes a complete movement trajectory and/or one or more segments of a movement trajectory. The term "predetermined contour" includes a complete predetermined contour and/or one or more segments of a predetermined contour. The term "cut contour" includes a complete cut contour and/or one or more segments of a cut contour.

The terms "high frequency beam-shaping movement" or "dynamic movement" of the laser beam or "moved at high frequency" or "dynamically moved" laser beam and variations thereof mean in the present context that the laser beam is moved at high frequency, for example at frequencies of 10 Hz to 15 kHz, in particular above 500 Hz. Similarly, the term "dynamic beam shaping" means that beam shaping is performed by dynamically movable, orientable and/or adjustable elements of the laser beam movement unit, for example with frequencies of 10 Hz to 15 kHz, in particular above 500 Hz. The same applies to the term "dynamically movable".

In all embodiments, the laser source for generating a machining laser beam can be designed such that a continuous and/or discontinuous, in particular pulsed, machining laser beam is provided.

Figure 1:
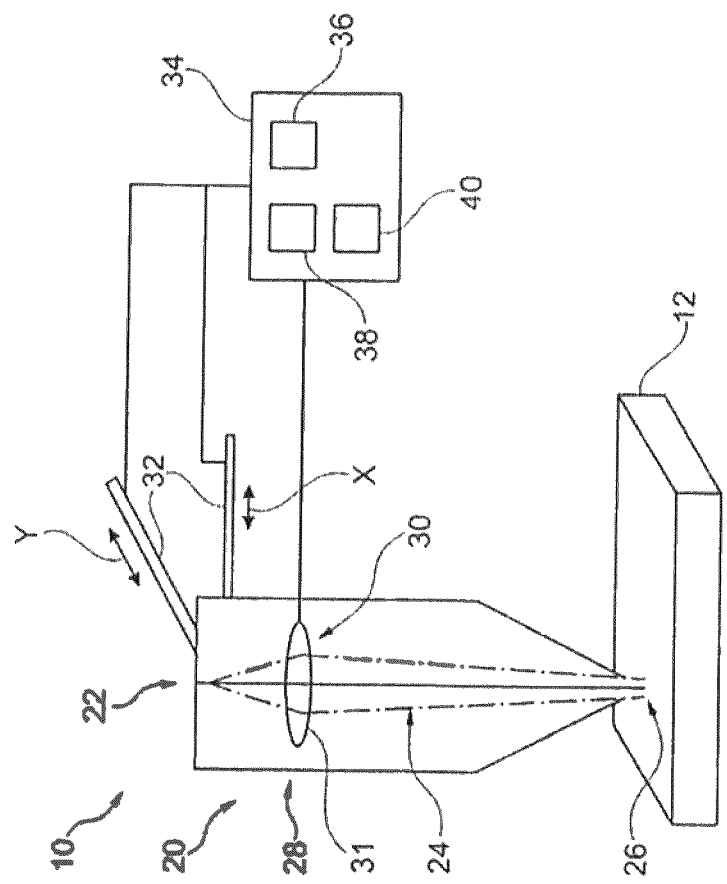
FIG. 1 schematically shows a first exemplary embodiment of a device for laser cutting a workpiece and for producing workpiece parts.

FIG. 1 schematically shows, as a first exemplary embodiment, a device 10 for laser cutting a workpiece 12 and for producing workpiece parts. In the present example, the workpiece 12 is a sheet of precious metal from which workpiece parts with a predetermined contour are produced by laser cutting. The device 10 for laser cutting is provided with a cutting head 20. The cutting head 20 has an interface 22 for a laser source to generate a machining laser beam 24 with a power of 1 kW. Here, the interface 22 is arranged at a first end of the cutting head 20. Alternatively, the interface 22 can also be provided on the side of the cutting head 20 to introduce the laser beam 24 laterally into the cutting head. An exit aperture 26 for the machining laser beam 24 is provided at a second end of the cutting head 20 opposite the first end. Laser beam optics 28 are provided between the interface 22 and the exit aperture 26. If the interface 22 is arranged at the first end of the cutting head, the laser beam 24 is guided through the cutting head by means of the laser beam optics 28 with its direction of propagation being essentially parallel to the central axis of the cutting head. If the interface 22 is provided in one side of the cutting head 20, the laser beam 24 is deflected at least once by means of the laser beam optics 28 and guided through the exit aperture 26 of the cutting head 20.

The laser beam optics 28 have at least one dynamic laser beam movement unit 30 for producing a high frequency beam-shaping movement, in particular a high frequency oscillation, of the machining laser beam 24 at least perpendicular to its direction of propagation, for example a DBS system. In the present example, a dynamically movable optical element 31 for beam shaping of the laser beam is provided as the dynamic laser beam movement unit 30, which is positioned or can be positioned in the beam path of the laser beam 24. In the present example, the optical element 31 is a focusing lens that can be tilted dynamically with one or more piezo actuators (not shown), which dynamically moves to shape the laser beam 24 and move the machining laser beam 24 perpendicular to its direction of propagation. In doing so, its intensity distribution perpendicular to its direction of propagation can also be adjusted. The focusing lens in this example has a mass of approximately 30 g. The focusing lens is dynamically movable with the actuator, in particular high frequency movable over one or more time periods, with frequencies above 100 Hz, preferably above 500 Hz.

In a modification of the present example, at least one movable surface reflecting the machining laser beam 24 is provided as an optical element 31 of the dynamic laser beam movement unit 30, which is arranged and aligned in the beam path in such a way that it deflects the machining beam 24. The machining laser beam 24, when introduced laterally into the cutting head 20, can thus be deflected within the cutting head, for example by 90°, before being directed onto the workpiece 12. The reflective surface is at least partially dynamically adjustable by means of at least one or more actuators, for example piezo actuators. For example, the at least one movable surface can be dynamically adjusted as a whole by means of at least one actuator. Furthermore, the at least one movable surface can provide a surface unit of the laser beam guiding device, the surface geometry of which, in particular its curvature, can be dynamically adjusted with actuators. As a result, not only can the machining laser beam be shaped and/or moved at least perpendicularly to its direction of propagation, but also the divergence of the machining laser beam can be changed and/or the focal position of the machining laser beam can be shifted parallel to its direction of propagation.

For example, the laser beam movement unit 30 can include, as the optical element 31, a dynamically orientable and planar mirror made of, for example, coated SiC (silicon carbide), which provides the movable surface that reflects the machining laser beam. At least one piezo actuator is provided as the actuator, with which the mirror can be moved dynamically and thereby be oriented. The unit consisting of a mirror and at least one actuator is also called a piezo scanner. In the case of multiple actuators, each piezo actuator can be controlled individually. For example, it is a piezo actuator based on a modified PZT (lead zirconate titanate) ceramic with a typical drive voltage of 120 V. For laser machining, the mirror with the movable surface is tilted by the at least one piezo actuator such that the machining laser beam 24 is deflected. At the same time, the surface is dynamically moved by the piezo actuators, providing suitable tilt angles for the deflection, so that the machining laser beam 24 is dynamically moved. In this manner, the beam parameter product of the machining laser beam 24 and/or the intensity distribution of the laser beam spot on the workpiece 12 is shaped as desired for laser cutting, since the focal point of the machining laser beam 24 is dynamically moved to be at least perpendicular to its direction of propagation at frequencies between, for example, 10 Hz and 15 kHz, thus shaping the laser beam spot striking the workpiece.

In a further variation of the first example, the laser beam movement unit 30 includes as the optical element 31 at least two movable reflective surfaces that are part of a galvanometer scanner. For this purpose, the galvanometer scanner can contain two mirrors, each of which provides a movable surface. These can be moved individually and dynamically as actuators, for example by means of individually controllable galvanometers. The galvanometer scanner is provided, for example, with two mirrors orientable such that the machining laser beam 24 is deflected at least once at an angle greater than 90° and at least once at an angle smaller than 90°. During operation, the two mirrors are oriented and moved relative to one another such that the machining laser beam 15 is deflected twice and is simultaneously dynamically moved. As a result, almost any intensity distributions of the beam spot and/or any beam parameter products of the machining laser beam 24 can be provided by means of dynamic beam shaping.

In another variation of the first example, the laser beam movement unit 30 has, as the reflective dynamically movable surface of the optical element 31, a segment mirror with a plurality of separate mirror segments arranged to be adjacent to one another to form a pattern. Each mirror segment has, for example, a gold coating, is reflective for the machining laser beam 24 and can be individually dynamically oriented by means of a piezo actuator. The laser beam movement unit 30 thus provides a segmented overall surface reflecting the machining laser beam 24, the surface geometry of which, in particular its curvature, is highly dynamically adjustable. The segment mirror is used for dynamic beam shaping. For this purpose, the surface of the segment mirror is changed with a sufficiently high frequency above 10 Hz, in particular above 100 Hz, such that the resulting focus on the workpiece 12 is moved dynamically at least laterally to the direction of propagation of the laser beam. The beam parameter product and/or the intensity distribution of the time-integrated machining laser beam can be modified as desired by the dynamic beam shaping.

In an additional variation of the first example, the laser beam movement unit 30 has a deformable mirror (DM, Dynamic Mirror) as a dynamic beam-shaping optical element 31 to provide a movable, reflective, continuous surface. The mirror is formed by a membrane made of deformable material, which is dynamically deformable by means of the actuators. For this purpose, there are individually controllable actuators that are evenly distributed in a pattern on the underside of the membrane. The top of the membrane is coated with a highly reflective dielectric multilayer coating, which is suitable for laser beams up to 120 kW at a wavelength of 1060 to 1090 nm. The movable, reflective, continuous surface of the deformable mirror (DM, dynamic mirror) can be operated in the same way as the previously described segment mirror.

The device 10 for laser cutting further includes a cutting head movement unit 32 which moves the cutting head 20, and thus the machining laser beam 24 guided therein, over the workpiece 12 at least in the X and/or Y direction. For example, the cutting head 20 is mounted on a carriage (not shown) which is movable in the X direction on a bridge (not shown) which is movable in the Y direction, as schematically illustrated with arrows in FIG. 1. The inertial components of the cutting head movement unit 32 and the cutting head 20 have a combined mass of approximately 400 kg in this example. In variations of the example, a movement of the cutting head 20 in the Z direction, i.e., in a direction perpendicular to the workpiece, can also be performed with the cutting head movement unit 32.

The device 10 for laser cutting is provided with a control unit 34 for controlling the cutting head movement unit 32 and the laser beam movement unit 30. The control unit 34 is connected, wirelessly or wired, in a data-transmitting manner to the cutting head movement unit 32 and the laser beam movement unit 30. The control unit 34 has a determination module 36 with which at least one movement trajectory of the machining laser beam 24 over the workpiece 12 can be determined. The movement trajectory is determined in at least one workpiece plane according to at least one predetermined contour of the workpiece parts to be produced. The control unit 34 further comprises a memory unit 38 in which at least one predetermined parameter selected from a movement parameter of the cutting head movement unit 32, a movement parameter of the laser beam movement unit 30 and a parameter of a deviation of a cut contour from the predetermined contour is stored and retrievable therefrom. The control unit 34 also includes an optimisation module 40 for adjusting the movement trajectory. The adjustment, i.e., optimisation, of the movement trajectory of the machining laser beam 24 is performed by overlaying the movement of the machining laser beam 24 via the cutting head 20 with the high frequency, beam-shaping movement of the machining laser beam 24 via the laser beam movement unit 30 on the basis of the at least one predetermined parameter retrievable from the memory unit 38.

Figure 2:
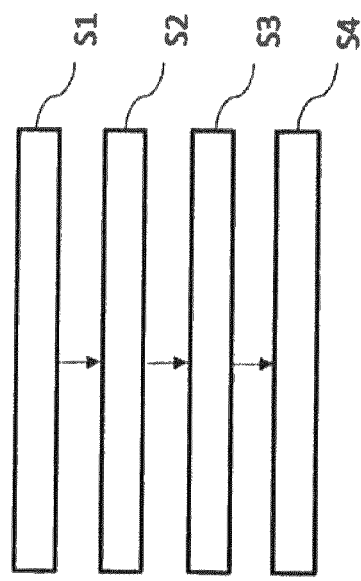
FIG. 2 schematically shows a method for laser cutting and for producing workpiece parts according to exemplary embodiments.

In operation of the device 10 for laser cutting, as illustrated in FIG. 2, the workpiece 12 is cut in steps S1 to S4 and workpiece parts are produced. In step S1, at least one movement trajectory X, Y of the machining laser beam 24 in at least one workpiece plane is determined by means of the determination module 40 of the control unit 34 in accordance with at least one predetermined contour X, Y of the workpiece parts to be produced. In step S2, the optimisation module 40 of the control unit 34 adjusts the movement trajectory by overlaying the movement of the machining laser beam via the cutting head 20 with the high frequency beam-shaping movement of the machining laser beam via the dynamic laser beam movement unit 30 based on the at least one predetermined parameter retrievable from the memory unit 38. This optimises the movement trajectory and an adjusted movement trajectory $X°$, $Y°$ is obtained. In the first exemplary embodiment, the movement trajectory is optimised by the optimisation module 40 by assigning a movement trajectory $X^*$, $Y^*$ to the cutting head movement unit 32 and deflections U, V of the optical element, U in the X direction and V in the Y direction, to the laser beam movement unit 30, resulting in an adjusted movement trajectory $X°$, $Y°$. In step S3, the machining laser beam 24 is generated with a power of at least 200 W, preferably at least 1 kW, and the workpiece 12 is cut with the machining laser beam 24. In step S4, the machining laser beam 24 is moved over the workpiece 12 by the cutting head movement unit 32 via the cutting head 20 and is moved and shaped at high frequency by the laser beam movement unit 30 at least perpendicular to its direction of propagation, according to the adjusted movement trajectory $X°$, $Y°$. Steps S1 and S2 can be performed simultaneously or consecutively or sequentially, i.e., the optimisation of the movement trajectory of the machining laser beam can be performed during or after the determination of the movement trajectory.

Figure 3:
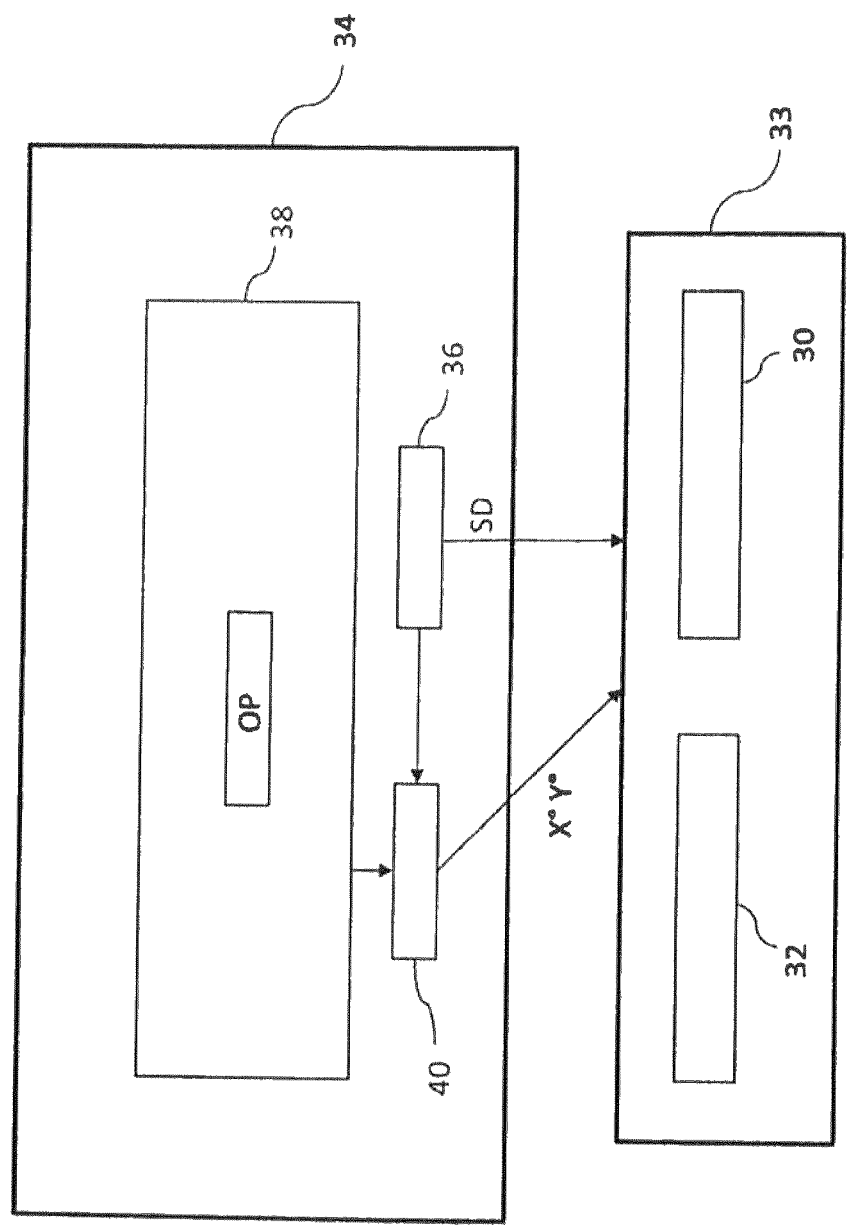
FIG. 3 schematically shows the interaction of the components of the device according to the first exemplary embodiment.

FIG. 3 schematically illustrates the interaction of the components of the device 10 during laser cutting of the first exemplary embodiment. In the control unit 34, the determination module 36 determines the movement trajectory X, Y according to the predetermined contour X, Y. From this, the optimisation module 40 determines the optimised and adjusted movement trajectory $X°$, $Y°$ using optimisation parameters OP stored in the memory unit 38 as predetermined parameters. The latter is used to control the movements of the dynamic laser beam movement unit 30 and the cutting head movement unit 32, which together form a laser beam movement system 33, during laser cutting. In this manner, the movement of the machining laser beam 24 via the cutting head 20 is overlaid on the high frequency beam-shaping movement of the machining laser beam 24 via the dynamic laser beam movement unit 30 according to the adjusted movement trajectory $X°$, $Y°$.

In all embodiments and exemplary embodiments, additional parameters can be stored in and retrieved from the memory unit 38. For example, the memory unit 38 can store: the predetermined contour X, Y, for example a cutting plan or NC code used in the determination module 36, for example a CNC or PLC control/controller, and machine and process parameters used in the determination module 36 and/or optimisation module 40. In the first exemplary embodiment, FIG. 3, said additional parameters can be retrieved and used by the determination module 36 and/or the optimisation module 40. Further, the laser beam movement system 33 can include a machine controller to which the data from the optimisation module 40 and the determination module 36 are transmitted. The determination module 36 can transmit control data SD, such as data on the Z-axis of the cutting head movement unit 32, gas pressure of the cutting gas, laser power for the machining laser beam 24, to the laser beam movement system 33. A buffer module can be connected between the determination module 36 and the laser beam movement system 33 or its machine control, which delays the performance of the commands from the determination module 36, for example by 100 ms, in order to have the necessary time available for the optimisation in the optimisation unit 40 and to enable a temporal synchronisation of the components of the device 10 for laser cutting. In all embodiments and exemplary embodiments, the optimisation module 40 can retrieve and use results from the determination module 36.

Figure 4:
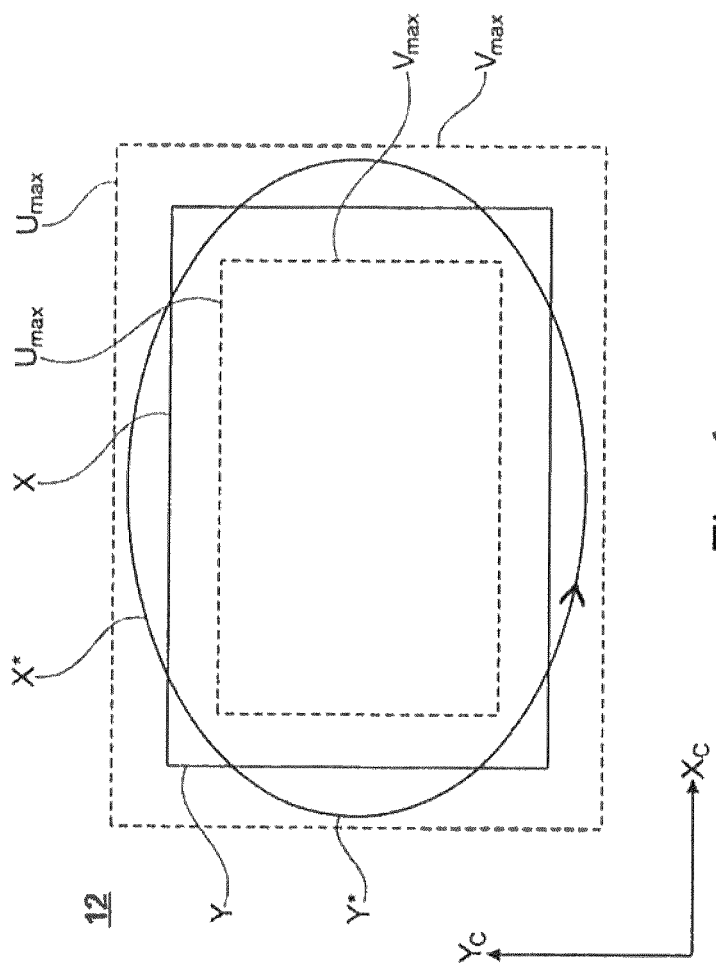
FIG. 4 schematically shows a movement trajectory of the machining laser beam over the workpiece and a predetermined contour of a workpiece part according to the first exemplary embodiment.

FIG. 4 schematically shows, according to the first exemplary embodiment, a movement trajectory of the machining laser beam over the workpiece 12 and a predetermined contour X, Y of a workpiece part. A coordinate system with axes $X_C$ and $Y_C$ is shown. The coordinates reflect the position of the machining laser beam 24 at time K, i.e., K defines a discrete-time step. The predetermined contour X, Y of the workpiece part to be cut is rectangular in this example. The movement trajectory $X^*$, $Y^*$ of the machining laser beam 24 assigned to the cutting head movement unit 32 by the optimisation module 40 is recognisable as an oval movement path in a direction, for example counter-clockwise (see arrow), which deviates from the predetermined contour X, Y. The rectangles enclosing the predetermined contour X, Y and shown with dashed lines indicate the maximum movement amplitudes, i.e., the maximum deflections, $U_{max}$ in the X direction and $V_{max}$ in the Y direction of the dynamically movable optical element of the laser beam movement unit 30, starting from the predetermined contour X, Y.

In this example, optimisation parameters OP in the form of dynamic limits of the cutting head movement unit 32 and the laser beam movement unit 30 are used as predetermined parameters. Based on these predetermined parameters, the optimisation module 40 determines the adjusted movement trajectory $X°$, $Y°$ by overlaying the movement of the machining laser beam 24 via the cutting head 20 with the high frequency beam-shaping movement of the machining laser beam 24 through the dynamic laser beam movement unit 30. In this case, the movement trajectory $X^*$, $Y^*$ is assigned to the cutting head movement unit 32 and the deflections U and V are assigned to the laser beam movement unit 30, so that the resulting adjusted movement trajectory $X°$, $Y°$ essentially corresponds to the predetermined contour X, Y of the workpiece part to be cut. $X°$, $Y°$ are obtained as coordinates for the adjusted movement trajectory: $X_K°=X_K^*+U_K$ and $Y_K°=Y_K^*+V_K$, with $K\in[0, T]$ and T as the time duration of the movement trajectory or a segment of the movement trajectory. By moving the machining laser beam 24 with the cutting head movement unit 32 and with the laser beam movement unit 30 according to the adjusted movement trajectory $X°$, $Y°$, a rectangular workpiece part having substantially the predetermined contour X, Y is produced during laser cutting, wherein contour errors are avoided or at least reduced.

In the present example, the movement trajectory corresponding to the predetermined contour of the workpiece part to be cut is partitioned and/or reallocated, in order to reduce contour errors: an optimised allocation of components of the movement trajectory to the laser beam movement unit results in smaller components of the inertial mechanical axes and the cutting head of the cutting head movement unit in the movement trajectory. The mechanical axes move more smoothly and with less vibration, as the high frequency components of the movement are performed by the dynamic laser beam movement unit. Therefore, there are fewer unwanted high frequency excitations of the mechanical axes and other components of the device 10 and fewer contour errors during laser cutting. This is especially true at corners, angles or other small or sharp structures of the predetermined contour. Furthermore, the stability of the components of the device 10 for laser cutting is increased and their wear is reduced. The allocation of the movement components in the movement trajectory is solved by an optimisation problem. For example, minimisation of the jerk and/or acceleration of the mechanical axes and the cutting head is achieved while maintaining boundary conditions such as dynamic limits of the mechanical axes of the cutting head movement unit, dynamic limits of the dynamic laser beam movement unit and a maximum deflection of the dynamically moving optical element. In this way, the adjusted, optimised movement trajectory is obtained.

Figure 5:
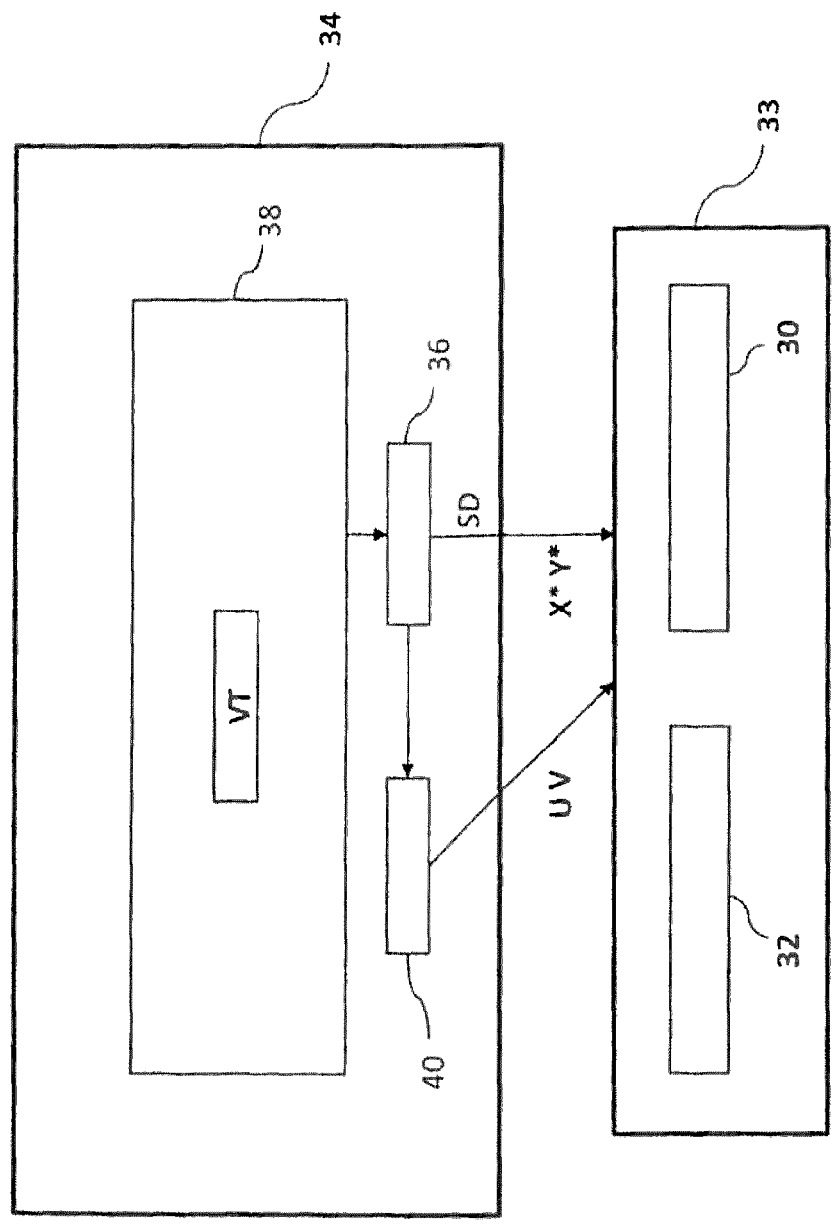
FIG. 5 schematically shows the interaction of the components of the device for laser cutting according to a second exemplary embodiment.

FIG. 5 shows a schematic representation of the interaction of the components of the device 10 for laser cutting according to a second exemplary embodiment. This is an example of an embodiment in which the optimisation module 40 is designed to adjust the movement trajectory based on an increased rounding tolerance of the cutting head movement unit 32. A rounding tolerance VT of the cutting head movement unit 32 is stored in the memory unit 38 as a predetermined parameter. The memory unit 38 can further store the additional parameters previously mentioned for the first exemplary embodiment, and these can be retrieved and used by the determination module 36 and/or the optimisation module 40. The rounding tolerance VT specifies a targeted rounding of the movement trajectory of the cutting head movement unit 32 at corners and small radii of the predetermined contour X, Y. The rounding tolerance VT is given as less than or equal to the maximum movement amplitudes Umar in the X direction and $V_{max}$ in the Y direction of the dynamically movable optical element of the laser beam movement unit 30. The greater the rounding tolerance VT selected, the less the speed of the cutting head 20 must be reduced in corners and small radii of the predetermined contour during laser cutting. A larger rounding tolerance VT is used than would be specified for the use of the cutting head movement unit 32 alone. Typical rounding tolerances and increased rounding tolerances can be stored in and retrieved from the memory unit. In the present example, an increased rounding tolerance VT is retrieved by the determination module 36 from the memory unit 38. The determination module 36 determines therefrom the movement trajectory X*, Y* with rounding and a movement trajectory X, Y without rounding, i.e., according to the predetermined contour X, Y. The rounding tolerance VT can be adjusted, for example, by means of an HMI (Human Machine Interface) or an automatic rule ("Performance Mode"). The determination module 36 can also provide the rounding tolerance VT to the optimisation module. The optimisation module 40 calculates the difference between the movement trajectory X*, Y* with rounding and the movement trajectory X, Y without rounding and assigns the difference values to the laser beam movement unit 30 as deflections U, V of the optical element. Coordinates for the difference values U and V are determined: $U_K=X_K^*-X_K$ and $V_K=Y_K^*-Y_K$, with $K\in[0, T]$ and T as the time duration of the movement trajectory or a segment of the movement trajectory. Thus, the difference value U is determined as the movement of the dynamically movable optical element of the laser beam movement unit 30 in the X direction and the difference value V is determined as the movement of the dynamically movable optical element of the laser beam movement unit in the Y direction. The resulting optimised movement amplitudes, i.e., the deflections U, V of the optical element 31 of the dynamic laser beam movement unit 30, are passed on to the laser beam movement system 33 by the optimisation module 40. The values X*, Y* specify the movement of the cutting head 20 in the X and Y directions and are passed on to the laser beam movement system 33 by the determination module 36, for example via the buffer module for time synchronisation. Thus, by combining, i.e., overlaying, the deflections U, V and the movement trajectory X*, Y*, an adjusted movement trajectory X°, Y° is obtained. In operation of the device of this example, using a high rounding tolerance for optimising the movement trajectory allows higher cutting speeds in corners and small radii of the predetermined contour. As a result, less time is required for the laser cutting process per workpiece part and the productivity of the device 10 for laser cutting is increased.

The present exemplary embodiment can be used, for example, in CNC-controlled machines in which the movement trajectory is calculated by a kernel, for example an ISG kernel. This takes into account, among other things, the dynamic properties of the mechanical axes. Rounding of the predetermined contour or trajectory can also be set, whereby, depending on the rounding tolerance, the speed in corners and small radii need not be reduced or is reduced less severely. If, in the exemplary embodiment of FIG. 5, a high rounding tolerance is now used for such machines, the speed of the cutting head 20 in corners and small radii of the predetermined contour will be greater, but the deviation between the cut part and the desired part will also be greater. The deviation caused by the high rounding tolerance is compensated for by the synchronous movement of the laser beam movement unit 30 overlaid on the movement of the cutting head 20. As a result, the productivity of the machine and also the accuracy when cutting the workpiece parts to be produced can be increased. Due to the rounding tolerance at corners and small radii of the predetermined contour, not only need the speed of the cutting head 20 not be reduced there, but the compensating movement of the laser beam movement unit 30 also results in fewer high frequency excitations of the mechanical axes of the cutting head movement unit 32, thus avoiding mechanical vibrations of the device 10 for laser cutting or of components of the device 10. Furthermore, the stability of the components of the device 10 for laser cutting is increased and their wear is reduced.

Figure 6:
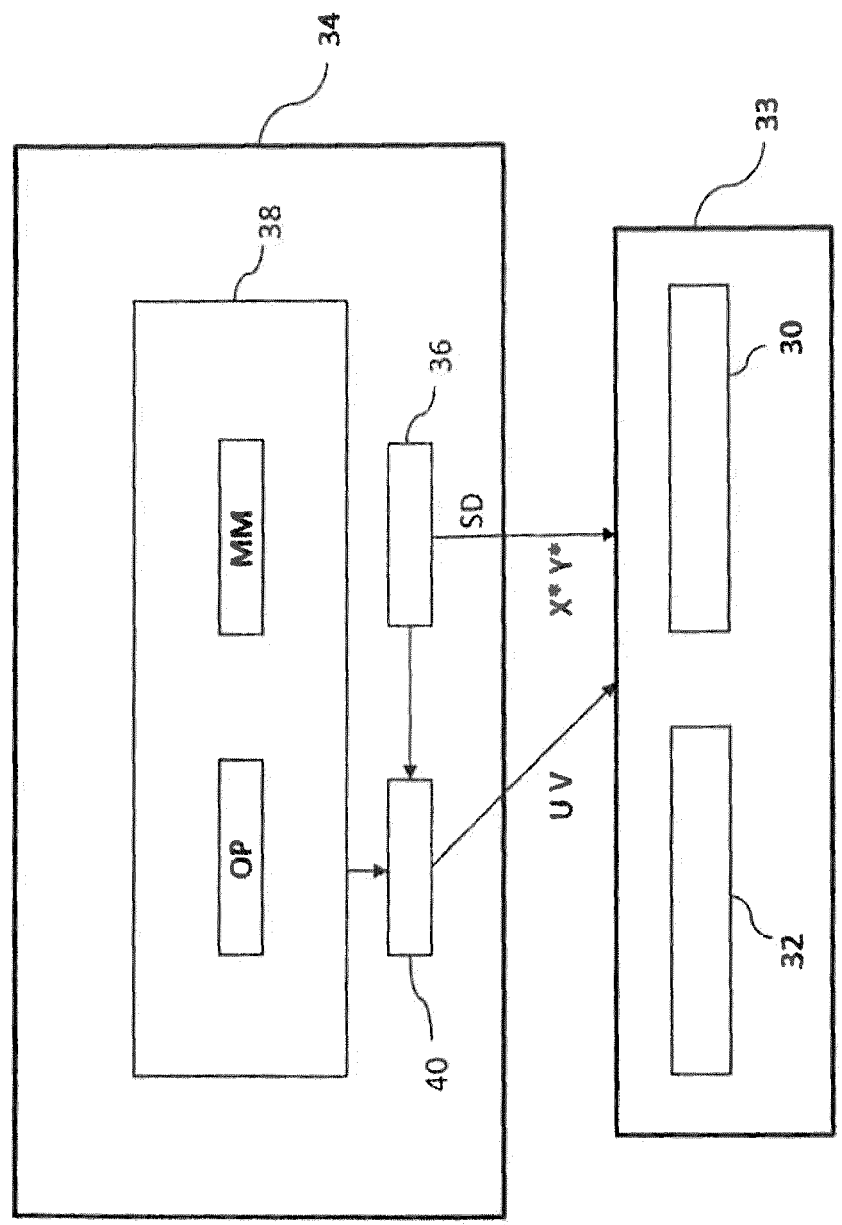
FIG. 6 schematically shows the interaction of the components of the device for laser cutting according to a third exemplary embodiment.

FIG. 6 schematically illustrates the interaction of the components of the device 10 for laser cutting according to a third exemplary embodiment. In addition to optimisation parameters OP, a machine model MM is stored in memory unit 38. The machine model MM represents the kinematic behaviour of the moving cutting head 20, and in some examples also of the mechanical axes, of the cutting head movement unit 32 and estimates, as movement parameters of the cutting head movement unit, state data of the movement of the cutting head, and possibly of the mechanical axes, and a resulting deviation of the cut contour from the predetermined contour X, Y. The optimisation module 40 is in data connection with the memory unit 38 for reading the optimisation parameters OP and the machine model MM. The memory unit 38 can further store the additional parameters previously mentioned for the first exemplary embodiment, and these can be retrieved and used by the optimisation unit 40 and/or the determination module 36.

A model that characterises the kinematic properties of machine tools can be used as a machine model MM. In particular, a model (for example Kalman filter) can be used to estimate contour errors at the tool centre point (TCP). Other machine models that can be used in the present example are based on differential equations and/or a two-mass model can be used in which, for example, the position of the TCP is described by means of a 4th order differential equation system (state-space representation). More complex models for TCP estimation can also take into account friction effects, backlash, temperature dependencies and other, partly non-linear effects. Machine models for TCP estimation can also be created by model reductions of FEM (Finite Element Method) models.

In operation, the determination module 36 determines the movement trajectory $X^*, Y^*$ of the machining laser beam 24 to be performed with the cutting head movement unit 32 as $X^*=X$ and $Y^*=Y$. Therefore, the original movement trajectory X, Y of the cutting head 20 to be performed by the mechanical axes of the cutting head movement unit 32 is not changed. The optimisation module 40 retrieves the movement trajectory $X^*, Y^*$, the optimisation parameters OP and the machine model MM and performs a model-based estimation of contour errors. Based on this, the optimisation module 40 calculates deflections U and V of the dynamically movable optical element of the laser beam movement unit 30 to compensate for contour errors, with deflections $U_K$ in the X direction and $V_K$ in the Y direction and $K \in [0, T]$ with T as the time duration of the movement trajectory or a segment of the movement trajectory. The resulting optimised movement amplitudes, i.e., the deflections U and V, of the optical element of the dynamic laser beam movement unit 30 are passed on to the laser beam movement system 33 by the optimisation module 40. The determination module 36 passes on the movement trajectory $X^*, Y^*$ of the machining laser beam 24, for example via the buffer module for time synchronisation, to the laser beam movement system 33. Thus, by combining, i.e., overlaying, the deflections U, V and the movement trajectory $X^*, Y^*$, an adjusted movement trajectory $X°, Y°$ is obtained. With the present exemplary embodiment, contour errors, for example at the TCP, can be estimated in a model-based manner. The estimated contour errors are compensated for by the laser beam movement unit 30. Because the optical element 31 of the laser beam movement unit 30 is moved in a highly dynamic manner, i.e., at high frequency, contour errors resulting, for example, from high-frequency vibrations of components of the device 10 can also be compensated for and more accurately cut workpiece parts can be obtained.

Figure 7:
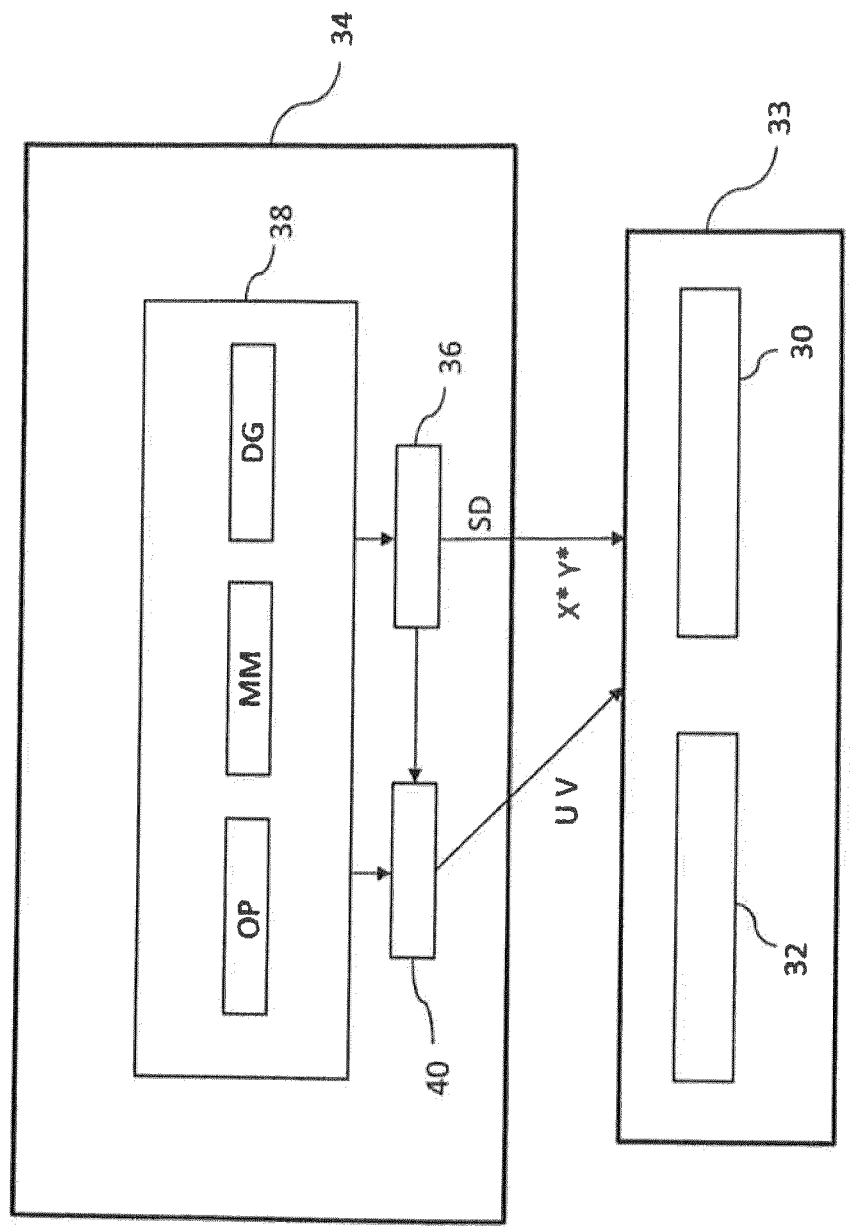
FIG. 7 schematically shows the interaction of the components of the device for laser cutting according to a fourth exemplary embodiment.

FIG. 7 schematically illustrates the interaction of the components of the device 10 for laser cutting according to a fourth exemplary embodiment, which is a modification of the third exemplary embodiment shown in FIG. 6. This is an example of an embodiment in which the optimisation module 40 is designed to adjust the movement trajectory based on an increased dynamic limit of the cutting head movement unit 32. In the memory unit 38, in addition to optimisation parameters OP and the machine model MM, at least one dynamic limit DG, increased in a targeted manner, of the cutting head movement unit 32 is stored, for example in the form of changed machine and/or process parameters. At least one typical dynamic limit DG of the cutting head movement unit 32 can also be stored. The determination module 36 determines the movement trajectory $X^*, Y^*$ of the machining laser beam 24 as $X^*=X$ and $Y^*=Y$ and, in the present example, retrieves the at least one dynamic limit DG increased in a targeted manner from the memory unit for this purpose. The optimisation module 40 retrieves the movement trajectory $X^*, Y^*$, the at least one dynamic limit DG increased in a targeted manner of the cutting head movement unit 32, the optimisation parameters OP and the machine model MM. The optimisation module 40 performs a model-based estimation of contour errors on this basis and determines deflections U and V of the dynamically movable optical element of the laser beam movement unit 30, with deflections $U_K$ in the X direction and $V_K$ in the Y direction and $K \in [0, T]$ with T as the time duration of the movement trajectory or a segment of the movement trajectory. The resulting optimised movement amplitudes, i.e., the deflections U and V, of the optical element of the dynamic laser beam movement unit 30 are passed on to the laser beam movement system 33 by the optimisation module 40. The determination module 36 passes the original movement trajectory X, Y of the machining laser beam as $X^*, Y^*$ unchanged to the cutting head movement unit 32 of the laser beam movement system 33. Thus, by combining, i.e., overlaying, the deflections U, V and the movement trajectory $X^*, Y^*$, an adjusted movement trajectory $X°, Y°$ is obtained. In this manner, estimated increased deviations from the predetermined contour, i.e., estimated contour errors, are compensated for with deflections of the optical element of the laser beam movement unit 30. With this exemplary embodiment, the productivity of the device 10 can be indirectly increased: by intentionally increasing the dynamic limits, for example the dynamic limits of the mechanical axes, of the cutting head movement unit 32, the deviations from the predetermined contour, for example at the TCP, become larger and the time required for the laser cutting process per workpiece part becomes smaller. At the same time, the larger deviations from the predetermined contour are compensated for by the dynamic laser beam movement unit 30, thus obtaining more accurately cut workpiece parts.

In a fifth exemplary embodiment, a process model PM (not shown) is combined with components of one or more other exemplary embodiments of the device for laser cutting, for example the first to fourth exemplary embodiments. In each case, the memory unit 34 additionally stores the process model PM, which represents the laser cutting process and estimates state data of the laser cutting process and a resulting deviation of the cut contour from the predetermined contour X, Y. A resulting deviation between corresponding actual state data and corresponding target state data and thus the quality of a cut workpiece part is estimated. In particular, the high laser power during laser cutting can be considered as state data of the laser cutting process. The optimisation module 40 retrieves the process model PM from the memory unit 34, which is used to calculate optimised process parameters based on the state data, such as the laser power, the feed rate, also called the cutting speed, the gas pressure of a cutting gas and/or the distance of the exit aperture of the cutting head from the workpiece. The optimised process parameters are additionally taken into account by the optimisation module 40 when determining the adjusted movement trajectory $X°, Y°$. This also applies when determining the optimised movement amplitudes, i.e., the deflections, of the optical element of the dynamic laser beam movement unit 30. This makes use of their high dynamics, whereby contour errors resulting from undesired high frequency excitations of components of the device 10 can also be compensated for, and lower excitation of the components and thus lower wear of the same is achieved. By using the process model, the cutting quality is also increased. A coupling between process model and machine model can be achieved by means of feed speed of the cutting head and/or cutting speed and/or nozzle distance. For example, it can happen that a sheet metal workpiece cannot be cut through if the feed rate is too high. This can be estimated by means of the process model PM and fed back to the determination module 36 and taken into account by the latter when determining the movement trajectory.

In a sixth exemplary embodiment, the laser beam movement unit 30 of other exemplary embodiments of the device for laser cutting realises a high frequency oscillation of the focal point of the machining laser beam on a focal point oscillation path in the form of one or more Lissajous figures. The control unit 34 has a database DB (not shown) of predetermined 2- and/or 3-dimensional Lissajous figures. The laser beam movement unit 30 is designed to induce a high frequency oscillation of the focal point of the machining laser beam 24 on a focal point oscillation path in the form of a Lissajous figure or a combination of more than one Lissajous figure based on the database. For example, the optical element 31 of the laser beam movement unit 30 can be a lens functionally connected to one or more actuators as excitation means for exciting an oscillation of the lens. The excitation means transmit excitation to the lens during operation of the laser cutting device 10, causing the lens to perform a repetitive oscillating movement. This oscillating movement leads to an oscillation of the focal point of the machining laser beam 24 at least perpendicular to its direction of propagation. Alternatively, an optical fibre, in particular a fibre end, a coupling for an optical fibre or an end cap of an optical fibre can be provided as the optical element of the laser beam movement unit 30, wherein the free end of the optical element is functionally connected to the actuator(s). According to another alternative, the optical element of the laser beam movement unit 30 can be an off-axis parabolic mirror having a centre with which the machining laser beam 24 is deflected and its focal point is oscillated on a focal point oscillation path. By performing a high frequency oscillation of the focal point of the machining laser beam 24 on a focal point oscillation path in the form of a Lissajous figure or a combination of more than one Lissajous figure by means of the dynamic laser beam movement unit 30 when adjusting the movement trajectory in the optimisation module 40, the cutting quality can be additionally improved, in particular the cutting quality for workpieces of higher thickness.

Figure 8:
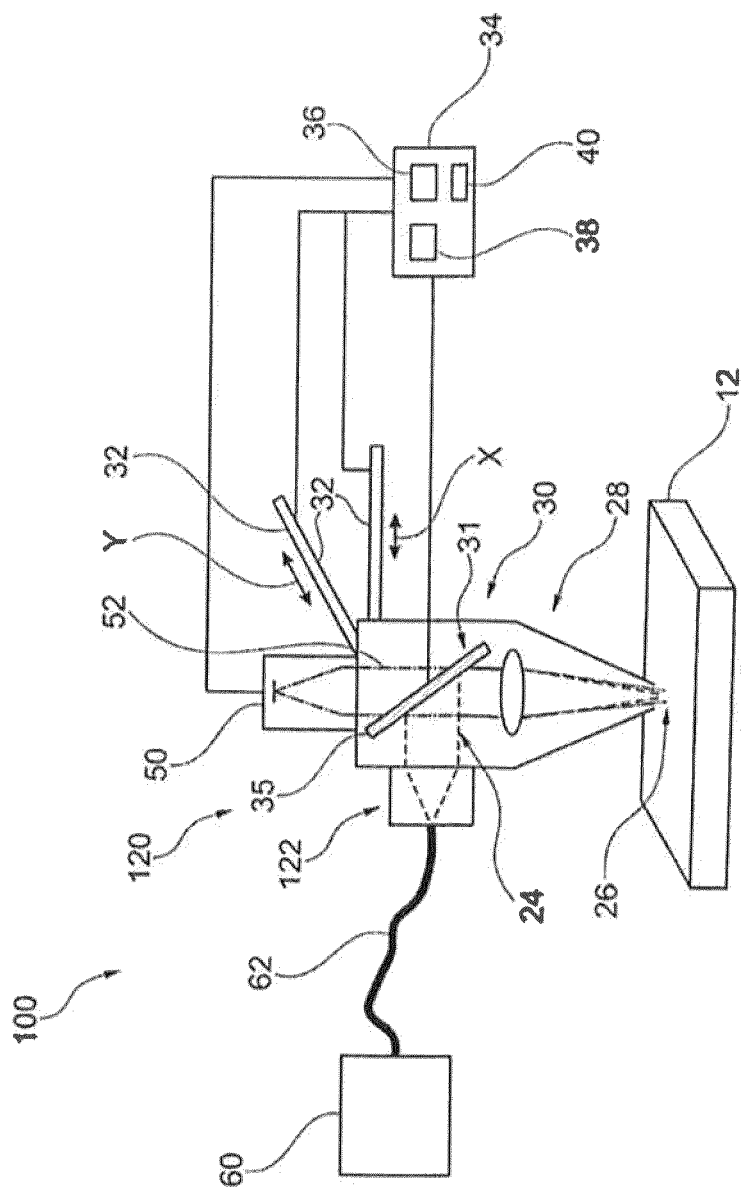
FIG. 8 schematically shows a seventh exemplary embodiment of a device for laser cutting the workpiece and producing workpiece parts.

FIG. 8 schematically shows, as a seventh exemplary embodiment, a device 100 for laser cutting the workpiece 12 and producing workpiece parts. Differences to the device 10 of FIG. 1 are described below. The seventh exemplary embodiment can be designed and operated in a correspondingly modified manner analogous to the first to sixth exemplary embodiments of the device 10.

The device 100 for laser cutting is provided with a cutting head 120. The cutting head 120 has an interface 122 for a laser source to generate a machining laser beam 24 with a power of 1 kW. Here, the interface 122 is provided in one side of the cutting head 20. A laser source 60 is provided at the interface 122, which is connected to the interface 122 by means of an optical fibre 62. As the dynamically movable optical element 31 of the dynamic laser beam movement unit 30 of the laser beam optics 28, a dynamic beam shaper with at least one movable reflecting surface is provided, with which the laser beam 24 is deflected at least once. For example, as shown in FIG. 8, a dichroic deflecting mirror 35 can be used for beam shaping of the laser beam, which can be or is positioned in the beam path of the laser beam 24. In addition, as shown in FIG. 8, an optional focusing lens can be arranged between the deflecting mirror 35 and the exit aperture 26. In the present example, the deflecting mirror 35 can be tilted dynamically with one or more piezo actuators (not shown). Dynamically moved, the deflecting mirror 35 deflects the laser beam 24 and simultaneously moves the machining laser beam 24 at least perpendicularly to its direction of propagation, thereby dynamically shaping it. In doing so, its intensity distribution perpendicular to its direction of propagation can also be adjusted. In this example, the deflecting mirror 35 has a mass of 4 to 15 g, for example approximately 10 g. The deflecting mirror 35 is dynamically movable with the actuator, in particular high frequency movable over one or more time periods, with frequencies above 100 Hz, preferably above 500 Hz.

A detector device 50 is provided at the first end of the cutting head 120 for observing the workpiece 12 and optionally the laser cutting process. The detector device 50 is, for example, a camera sensitive to a process light 52. The process light 52 is the radiation emitted from the workpiece 12 through the exit aperture 26 and includes radiation generated by laser machining of the workpiece and/or reflected illumination light. This allows the cut edge produced during laser cutting to be imaged and measured. Further, the detector device 50 can comprise an adaptive optical unit. The adaptive optical unit, for example adaptive optics or adaptive lens (focus-tunable lens), permits the sharpness level of the detector device to be varied in parallel with the direction of propagation of the machining beam depending on the focus position, the workpiece thickness and the desired process observation level.

The optical element 31 is designed as a dichroic mirror 35. In the present example, the mirror is a glass mirror (for example $SiO_2$, fused silica) or another mirror that is transparent to visible process light. The dichroic mirror 35 is provided, at least on one side, i.e., on the side facing the laser source, with a dielectric coating. The size of the mirror 35 is chosen such that it corresponds to the diameter of the machining laser beam 24 in the position of the mirror. The dichroic mirror at least partially reflects the machining laser beam 24 and is selectively transparent to at least part of the process light 52.

In the device 100 for laser cutting, the control unit 34 is also connected to the detector device wirelessly or wired, in a data-transmitting manner, and can thus be used for observing the produced cut edge for measuring surface defects and optionally for process monitoring. The memory unit 38 can further store the additional parameters previously mentioned for the first exemplary embodiment, and these can be retrieved and used by the determination module 36 and/or the optimisation module 40.

Figure 9:
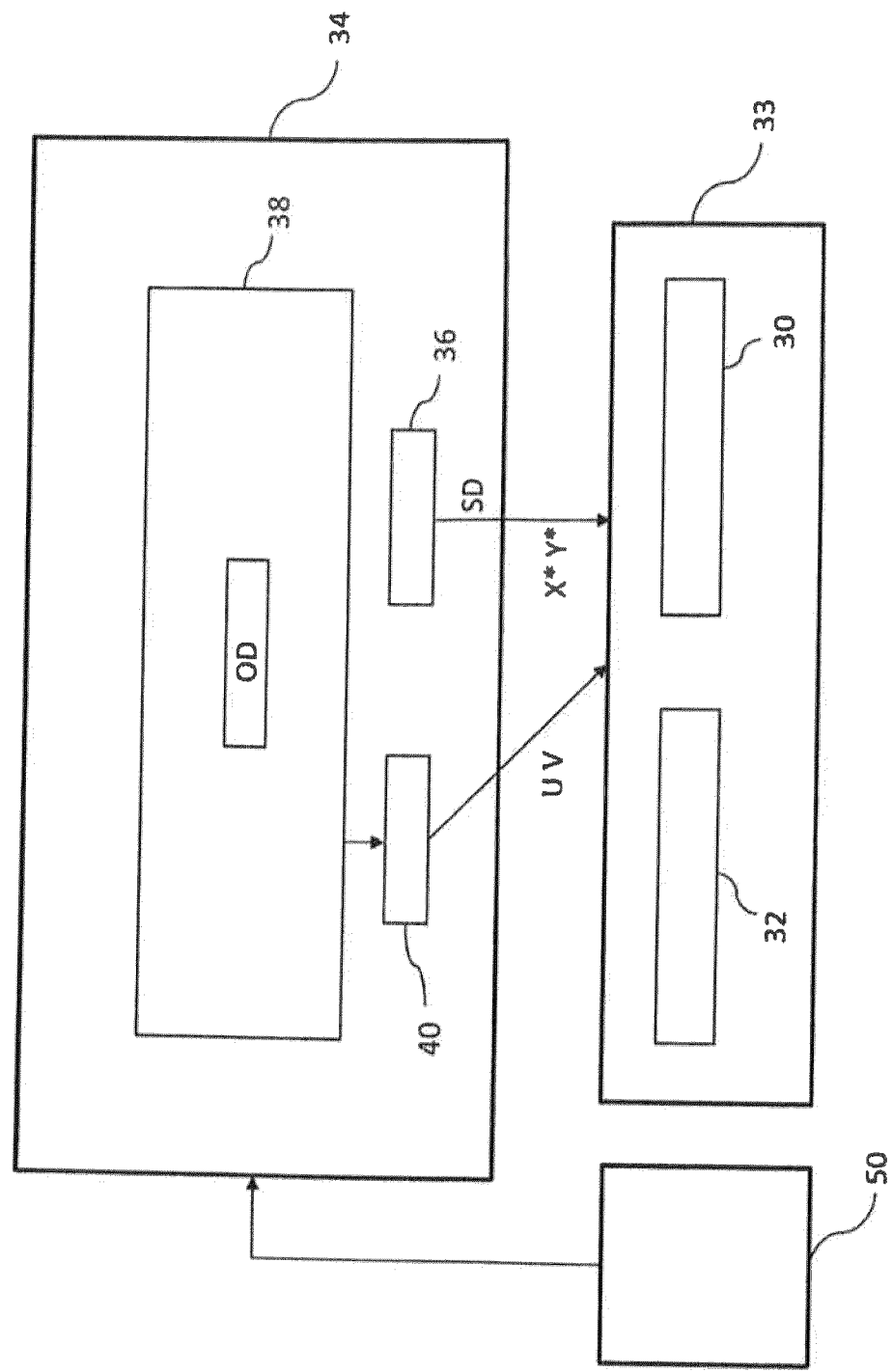
FIG. 9 schematically shows the interaction of the components of the device for laser cutting according to the seventh exemplary embodiment.

FIG. 9 schematically illustrates the interaction of the components of the device 100 for laser cutting according to the seventh exemplary embodiment. In operation of the device 100, the machining laser beam 24 is moved over the workpiece 12 by the cutting head movement unit 32 via the cutting head 20 and the workpiece 12 is cut. In this case, surface defects OD of the cut edge of the workpiece 12, for example scoring, grooves or burrs, are detected by the detector device 50 as a measured deviation of the cut contour from the predetermined contour X, Y of the workpiece and resulting parameters are determined. These parameters are passed to the memory unit 38 and retrieved from there by the optimisation module 40 as a predetermined parameter. Based on this, the optimisation module 40 induces a modulation of the dynamic movement of the machining laser beam 24 by the laser beam movement unit 30 counteracting the surface defects OD. For this purpose, the optimisation module 40 calculates deflections U and V of the dynamically movable optical element 31, in this case the deflecting mirror 35, of the laser beam movement unit 30 for compensation of the surface defects, with deflections $U_K$ in the X direction and $V_K$ in the Y direction and $K \in [0, T]$ with T as the time duration of the movement trajectory or of a segment of the movement trajectory. The resulting optimised movement amplitudes, i.e., the deflections U and V, of the deflecting mirror 35 of the dynamic laser beam movement unit 30 are passed on to the laser beam movement system 33 by the optimisation module 40. The determination module 36 determines the movement trajectory X*, Y* of the machining laser beam 24 as X*=X and Y*=Y and passes this on, for example via the buffer module for time synchronisation, to the cutting head movement unit 32 of the laser beam movement system 33. The original movement trajectory X, Y of the cutting head 20 to be performed by the mechanical axes of the cutting head movement unit 32 is therefore not changed. Thus, by combining, i.e., overlaying, the deflections U, V and the movement trajectory X*, Y*, an adjusted movement trajectory X°, Y° is obtained.

During operation of the device 100, in particular dimensions and/or periodically recurring patterns, for example their amplitude and frequency, of the surface defects can be determined. For example, when thermal cutting the workpiece 12 using oxygen as the cutting gas, a thermal image of the process light 52 is captured in the NIR/IR range. In regions of the cut edge without surface defects, local intensity minima of the thermal image with reduced radiation intensity are present. The size of the dimensions of the intensity minima can be observed in the thermal image. In the event of an undesirable decrease in this size, the optimisation module 40 induces a modulation of the dynamic movement of the machining laser beam through the laser beam movement unit 30 that counteracts the surface defects.

Figure 10:
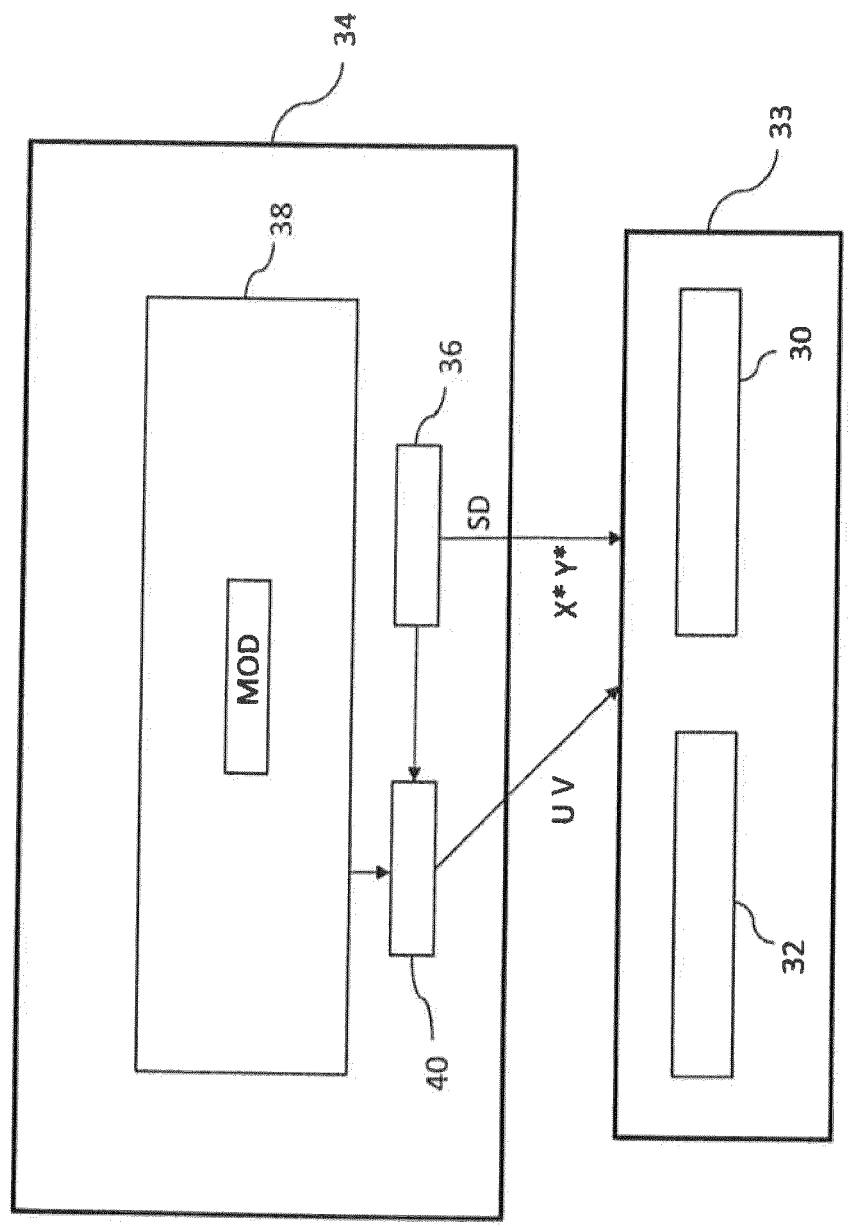
FIG. 10 schematically shows an interaction of the components of the device for laser cutting according to an eighth exemplary embodiment.

FIG. 10 schematically illustrates the interaction of the components of the device 100 for laser cutting according to an eighth exemplary embodiment. The eighth exemplary embodiment is a modification of the seventh exemplary embodiment. No detector 50 is provided on the device 100 in the eighth exemplary embodiment. Rather, a model MOD for estimating surface defects is stored in the memory unit 38 and is retrievable by the optimisation module 40. As a model MOD for estimating surface defects, for example, a model for estimating scoring can be used, with which the roughness, i.e., the amplitude and frequency, of the scores of the cut edge can be calculated by a damped oscillator with a disruptive term. Alternatively, the roughness can be modelled by an adaptive neuro-fuzzy inference system (ANFIS). The model can be used to estimate surface defects of the cut edge of the workpiece 12, for example scoring, grooves or burrs, as a deviation of the cut contour from the predetermined contour X, Y of the workpiece. In operation, the optimisation module 40 retrieves the MOD surface defect estimation model and performs a model-based surface defect estimation. Based on this, the optimisation module induces a modulation of the dynamic movement of the machining laser beam 24 by the laser beam movement unit 30 that counteracts the surface defects. For this purpose, the optimisation module 40 calculates deflections U and V of the dynamically movable optical element 31, in this case the deflecting mirror 35, of the laser beam movement unit 30 for compensation of the surface defects, with deflections $U_K$ in the X direction and $V_K$ in the Y direction and $K \in [0, T]$ with T as the time duration of the movement trajectory or of a segment of the movement trajectory. The resulting optimised movement amplitudes, i.e., the deflections U and V, of the deflecting mirror 35 of the dynamic laser beam movement unit 30 are passed on to the laser beam movement system 33 by the optimisation module 40. The determination module 36 determines the movement trajectory X*, Y* of the machining laser beam 24 as X*=X and Y*=Y and passes this on, for example via the buffer module for time synchronisation, to the cutting head movement unit 32 of the laser beam movement system 33. The original movement trajectory X, Y of the cutting head 20 to be performed by the mechanical axes of the cutting head movement unit 32 is therefore not changed. Thus, by combining, i.e., overlaying, the deflections U, V and the movement trajectory X*, Y*, an adjusted movement trajectory X°, Y° is obtained.

In a ninth embodiment, the methods performable by the devices of the first to eighth exemplary embodiments can be performed after a previous laser cutting of the workpiece 12 performed with the at least one movement trajectory determined by the determination module 36 without using the optimisation module 40. As a result, melt and/or melt droplets adhering to the workpiece 12, in particular to the cut edge, and burrs or other surface defects, such as scoring, can be reduced and/or removed by re-machining the workpiece or the produced workpiece parts with the machining laser beam 24 optimised by the optimisation module 40 and targeted melting and blowing out with a cutting gas or vaporisation.

LIST OF REFERENCE SYMBOLS

10 Device for laser cutting
12 Workpiece
20 Cutting head
22 Interface
24 Machining laser beam
26 Exit aperture
28 Laser beam optics
30 Laser beam movement unit
31 Optical element
32 Cutting head movement unit
33 Laser beam movement system
34 Control unit
Deflecting mirror
36 Determination module
38 Memory unit
40 Optimisation module
50 Detector unit
52 Process light
60 Laser source
62 Optical fibre
100 Device for laser cutting
120 Cutting head
122 Interface
$X_C$ X-axis coordinate system
$Y_C$ Y-axis coordinate system
K Point in time
T Time duration
OP Optimisation parameters
SD Control data
VT Rounding tolerance MM Machine model
DG Dynamic limit
PM Process model
DB Database
OD Surface defect
MOD Surface defect estimation model
U Deflection of the optical element in X direction
V Deflection of the optical element in Y direction
X Predetermined contour in X direction
Y Predetermined contour in Y direction
X, Y Predetermined contour
X, Y Movement trajectory according to predetermined contour
X*, Y* Movement trajectory
X°, Y° Adjusted (optimised) movement trajectory

The invention claimed is:

1. A device for laser cutting a workpiece and producing workpiece parts, the device comprising:
   a cutting head, the cutting head having an interface for a laser source for generating a machining laser beam with a power of at least 200 W or at least 1 kW,
   an exit aperture for the machining laser beam, and
   laser beam optics between the interface and the exit aperture,
   the laser beam optics having at least one dynamic laser beam movement unit for producing a high frequency beam-shaping movement of the machining laser beam at least perpendicular to its direction of propagation;
   a cutting head movement unit for performing a movement of the machining laser beam over the workpiece via the cutting head; and
   a control unit for controlling the cutting head movement unit and the laser beam movement unit, the control unit comprising:
      a determination module for determining at least one movement trajectory (X, Y) of the machining laser beam in at least one workpiece plane according to at least one predetermined contour (X, Y) of the workpiece parts to be produced; and
      a memory unit from which at least one predetermined parameter selected from a movement parameter of the cutting head movement unit, a movement parameter of the laser beam movement unit and a parameter of a deviation of a cut contour from the predetermined contour is retrievable;
      wherein the control unit comprises:
         an optimisation module for adjusting the movement trajectory (X, Y) by overlaying the movement of the machining laser beam via the cutting head with the high frequency beam-shaping movement of the machining laser beam via the laser beam movement unit based on the at least one predetermined parameter retrievable from the memory unit;
         wherein the optimisation module is configured for optimising the movement trajectory (X; Y) by redundantly partitioning the movement trajectory of the machining laser beam between the cutting head movement unit and the laser beam movement unit.

2. The device according to claim 1, wherein the optimisation module is configured for adjusting and/or optimising at least one parameter selected from the movement parameter of the cutting head movement unit, the movement parameter of the laser beam movement unit and the parameter of a deviation of a cut contour from the predetermined contour, and for predetermining the at least one predetermined parameter.

3. The device according to claim 1, wherein the movement parameter of the cutting head movement unit is at least one parameter selected from a dynamic limit (DG) of the cutting head movement unit, a rounding tolerance (VT) of the cutting head movement unit at an angle of the predetermined contour, and a rounding tolerance (VT) of the cutting head movement unit at a radius of the predetermined contour.

4. The device according to claim 1, wherein the movement parameter of the laser beam movement unit is at least one parameter selected from a dynamic limit (DG) of the laser beam movement unit and a maximum movement amplitude of the machining laser beam that can be generated with the laser beam movement unit.

5. The device according to claim 1, wherein the parameter of a deviation of a cut contour from the predetermined contour (X, Y) is at least one parameter selected from an estimated deviation, a parameter resulting from a measured deviation, a rounding of the cut contour at an angle of the predetermined contour, a rounding of the cut contour at a radius of the predetermined contour, an estimated surface defect (OD) of a cut edge, and a parameter resulting from a measured surface defect of a cut edge.

6. The device according to claim 1, wherein the optimisation module for adjusting the movement trajectory is designed based on at least one increased rounding tolerance (VT) of the cutting head movement unit and is for compensating for the resulting deviation of the cut contour from the predetermined contour.

7. The device according to claim 1, wherein a machine model (MM) representing the kinematic behaviour of the moving cutting head is stored in the memory unit and estimates, as a movement parameter of the cutting head movement unit, state data of the cutting head movement and, as a further parameter, a resulting deviation of the cut contour from the predetermined contour, and wherein the optimisation module is in data communication with the memory unit for reading the machine model.

8. The device according to claim 1, wherein the optimisation module is configured to adjust the movement trajectory based on at least one increased dynamic limit (DG) of the cutting head movement unit.

9. The device according to claim 1, wherein a process model representing the laser cutting process and estimating as parameters state data of the laser cutting process and a resulting deviation of the cut contour from the predetermined contour is stored in the memory unit, and wherein the optimisation module is in data communication with the memory unit for reading the process model.

10. The device according to claim 1, wherein the control unit comprises a database of predetermined 2- and/or 3-dimensional Lissajous figures and the laser beam movement unit is configured to induce a high frequency oscillation of the focal point of the machining laser beam on a focal point oscillation path in the form of a Lissajous figure or a combination of more than one Lissajous figure based on the database.

11. The device according to claim 1, wherein a detector device connected in a data-transmitting manner to the memory unit is provided on or in the cutting head for measuring a surface defect of a cut edge, including a scoring, as the parameter of a deviation of the cut contour from the predetermined contour (X, Y); and/or wherein a model (MOD) for estimating a surface defect of a cut edge, in particular of scoring, is stored in the memory unit, which estimates as a parameter a surface defect (OD) and a resulting deviation of the cut contour from the predetermined contour, and wherein the optimisation module is in data communication with the memory unit in order to read the model for estimating a surface defect.

12. A method for laser cutting a workpiece and producing workpiece parts with a device for laser cutting a workpiece and producing workplace parts, wherein, the device comprises:
a cutting head, the cutting head having an interface for a laser source for generating a machining laser beam with a power of at least 200 W or at least 1 kW,
an exit aperture for the machining laser beam, and
laser beam optics between the interface and the exit aperture,
the laser beam optics having at least one dynamic laser beam movement unit for producing a high frequency beam-shaping movement of the machining laser beam at least perpendicular to its direction of propagation;
a cutting head movement unit for performing a movement of the machining laser beam over the workpiece via the cutting head; and
a control unit for controlling the cutting head movement unit and the laser beam movement unit, the control unit comprising:
a determination module for determining at least one movement trajectory (X, Y) of the machining laser beam in at least one workpiece plane according to at least one predetermined contour (X, Y) of the workpiece parts to be produced; and
a memory unit from which at least one predetermined parameter selected from a movement parameter of the cutting head movement unit, a movement parameter of the laser beam movement unit and a parameter of a deviation of a cut contour from the predetermined contour is retrievable;
wherein the control unit comprises:
an optimisation module for adjusting the movement trajectory (X, Y) by overlaying the movement of the machining laser beam via the cutting head with the high frequency beam-shaping movement of the machining laser beam via the laser beam movement unit based on the at least one predetermined parameter retrievable from the memory unit;
wherein the optimisation module is configured for optimising the movement trajectory (X; Y) by redundantly partitioning the movement trajectory of the machining laser beam between the cutting head movement unit and the laser beam movement unit, the method comprising the steps of:
by means of the determination module of the control unit, determining at least one movement trajectory of the machining laser beam in at least one workpiece plane according to at least one predetermined contour (X, Y) of the workpiece parts to be produced;
by means of the optimisation module of the control unit, adjusting the movement trajectory by overlaying the movement of the machining laser beam via the cutting head with the high frequency beam-shaping movement of the machining laser beam via the dynamic laser beam movement unit on the basis of the at least one predetermined parameter retrievable from the memory unit;

producing the machining laser beam with a power of at least 200 W or of at least 1 kW and cutting the workpiece with the machining laser beam; and
moving the machining laser beam over the workpiece via the cutting head and performing a high frequency beam-shaping movement of the machining laser beam at least perpendicular to its direction of propagation via the laser beam movement unit according to the adjusted movement trajectory (X°, Y°);
wherein the adjusting includes optimising the movement trajectory (X; Y) by redundantly partitioning the movement trajectory of the machining laser beam between the cutting head movement unit and the laser beam movement unit.

13. The method according to claim 12, wherein at least one parameter selected from the movement parameter of the cutting head movement unit, the movement parameter of the laser beam movement unit and the parameter of a deviation of a cut contour from the predetermined contour is adjusted and/or optimised, for predetermining the at least one predetermined parameter.

14. The method according to claim 12, wherein the adjustment is performed on the basis of at least one increased rounding tolerance (VT) of the cutting head movement unit and includes compensating for the resulting deviation of the cut contour from the predetermined contour.

15. The method according to claim 12, wherein a machine model (MM) representing the kinematic behaviour of the moving cutting head is stored in the memory unit and estimates as movement parameter of the cutting head movement unit, state data of the cutting head movement and, as a further parameter, a resulting deviation of the cut contour from the predetermined contour, and wherein the adjustment comprises reading the machine model from the memory unit into the optimisation module.

16. The method according to claim 12, wherein the adjustment is performed based on at least one increased dynamic limit (DG) of the cutting head movement unit.

17. The method according to claim 12, wherein the memory unit stores a process model representing the laser cutting process and estimating as parameters state data of the laser cutting process and a resulting deviation of the cut contour from the predetermined contour, and wherein the adjustment comprises reading the process model from the memory unit into the optimisation module.

18. The method according to claim 12, wherein the control unit comprises a database of predetermined 2- and/or 3-dimensional Lissajous figures and the laser beam movement unit induces a high frequency oscillation of the focal point of the machining laser beam on a focal point oscillation path in the form of a Lissajous figure or a combination of more than one Lissajous figure based on the database.

19. The method according to claim 12, wherein a detector device connected in a data-transmitting manner to the memory unit is provided on or in the cutting head and the detector device measures a surface defect of a cut edge, in particular of scoring, as the parameter of a deviation of the cut contour from the predetermined contour; and/or
wherein a model (MOD) for estimating a surface defect of the cut edge, in particular of scoring, is stored in the memory unit, which estimates as a parameter a surface defect and a resulting deviation of the cut contour from the predetermined contour, and wherein the adjustment comprises reading the model for estimating a surface defect from the memory unit into the optimisation module.

20. The method according to claim 12, further comprising repeating the method after a previous laser cutting of the workpiece performed with the at least one movement trajectory determined by the determination module.

21. A computer program product comprising one or more program modules loaded into a memory of a device, comprising at least one element selected from a determination module and a optimisation module,
the device comprising:
a cutting head, the cutting head having an interface for a laser source for generating a machining laser beam with a power of at least 200 W or at least 1 kW,
an exit aperture for the machining laser beam, and
laser beam optics between the interface and the exit aperture,
the laser beam optics having at least one dynamic laser beam movement unit for producing a high frequency beam-shaping movement of the machining laser beam at least perpendicular to its direction of propagation;
a cutting head movement unit for performing a movement of the machining laser beam over the workpiece via the cutting head; and
a control unit for controlling the cutting head movement unit and the laser beam movement unit, the control unit comprising:
a determination module for determining at least one movement trajectory (X, Y) of the machining laser beam in at least one workpiece plane according to at least one predetermined contour (X, Y) of the workpiece parts to be produced; and
a memory unit from which at least one predetermined parameter selected from a movement parameter of the cutting head movement unit, a movement parameter of the laser beam movement unit and a parameter of a deviation of a cut contour from the predetermined contour is retrievable;
wherein the control unit comprises:
an optimisation module for adjusting the movement trajectory (X, Y) by overlaying the movement of the machining laser beam via the cutting head with the high frequency beam-shaping movement of the machining laser beam via the laser beam movement unit based on the at least one predetermined parameter retrievable from the memory unit;
wherein the optimisation module is configured for optimising the movement trajectory (X; Y) by redundantly partitioning the movement trajectory of the machining laser beam between the cutting head movement unit and the laser beam movement unit, the method steps comprising:
by means of the determination module of the control unit, determining at least one movement trajectory of the machining laser beam in at least one workpiece plane according to at least one predetermined contour (X, Y) of the workpiece parts to be produced;
by means of the optimisation module of the control unit, adjusting the movement trajectory by overlaying the movement of the machining laser beam via the cutting head with the high frequency beam-shaping movement or the machining laser beam via the dynamic laser beam movement unit on the basis of the at least one predetermined parameter retrievable from the memory unit;
producing the machining laser beam with a power of at least 200 W or of at least 1 kW and cutting the workpiece with the machining laser beam; and
moving the machining laser beam over the workpiece via the cutting head and performing a high frequency beam-shaping movement of the machining laser beam at least perpendicular to its direction of propagation via the laser beam movement unit according to the adjusted movement trajectory (X°, Y°);
wherein the adjusting includes optimising the movement trajectory (X: Y) by redundantly partitioning the movement trajectory or the machining laser beam between the cutting head movement unit and the laser beam movement unit.

22. A computer-readable medium on which a computer program product is stored, the computer program product comprising:
one or more program modules configured to perform the methods steps of:
by means or a determination module of a control unit for a device, determining at least one movement trajectory of a machining laser beam in at least one workpiece plane according to at least one predetermined contour (X, Y) or a workpiece part to be produced;
by means of an optimisation module of the control unit, adjusting a movement trajectory by overlaying a movement of the machining laser beam via a cutting head of the device with a high frequency beam-shaping movement of the machining laser beam via a dynamic laser beam movement unit on a basis of a at least one predetermined parameter;
producing the machining laser beam with a power of at least 200 W and cutting the workpiece with the machining laser beam; and
moving the machining laser beam over the workpiece via the cutting head and performing a high frequency beam-shaping movement of the machining laser beam at least perpendicular to its direction of propagation via the laser beam movement unit according to an adjusted movement trajectory (X, Y);
wherein the adjusting includes optimising the at least one movement trajectory (X, Y) by redundantly partitioning the at least one movement trajectory of the machining laser beam between the cutting head movement unit and the laser beam movement unit.

* * * * *